(12) United States Patent
Arakawa

(10) Patent No.: US 6,188,807 B1
(45) Date of Patent: *Feb. 13, 2001

(54) SCANNER SERVER APPARATUS AND SCANNER SERVER SYSTEM

(75) Inventor: Naoto Arakawa, Yokohama (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/720,908

(22) Filed: Oct. 3, 1996

(30) Foreign Application Priority Data

Oct. 4, 1995 (JP) ...... 7-257660
Oct. 4, 1995 (JP) ...... 7-257661

(51) Int. Cl.$^7$ ...... G06K 9/00
(52) U.S. Cl. ...... 382/319; 382/305; 358/407; 358/408
(58) Field of Search ...... 382/319, 296, 382/305; 358/486, 1.13, 1.14, 407, 408, 442, 468

(56) References Cited

U.S. PATENT DOCUMENTS

| | | | |
|---|---|---|---|
| 5,161,214 | * 11/1992 | Addink et al. | 345/331 |
| 5,168,371 | * 12/1992 | Takayanagi | 358/296 |
| 5,301,244 | 4/1994 | Parulski | 382/59 |

FOREIGN PATENT DOCUMENTS

| | | | |
|---|---|---|---|
| 0529864 | 3/1993 | (EP) | G06F/15/16 |
| WO 9205668 | 4/1992 | (WO) | H04N/9/11 |

OTHER PUBLICATIONS

Andrew Tribute, Seybold Report on Publishing System, v25, n2, p. 12 (10), Sep. 18, 1995.*
Urban Joner, Seybold Report on Publishing System, v24, n19, p. 22 (8), Jun. 22, 1995*
Seybold Repot on Publighing System, v24, n21, p. 20 (17), Jul. 21, 1995.*
"Managing documents and workflow, text/image retrieval" The Seybold report on publishing system v22 n17 p. 23 (12), May 1993.*
Patent Abstracts of Japan, vol. 012, No. 072 (E–588), Mar. 5, 1988 & JP 62 213369 A (Fujitsu Ltd), Sep. 19, 1987, *abstract*.

* cited by examiner

Primary Examiner—Amelia Au
Assistant Examiner—Jingge Wu
(74) Attorney, Agent, or Firm—Fitzpatrick, Cella, Harper & Scinto

(57) ABSTRACT

A scanner server is structured to execute, at independent times, prescan process, for storing image data output from a scanner in a prescan for reading an original document image at a low resolution, and a final scan process for storing the image data output from the scanner in a final scan for reading an original document image at a high resolution in accordance with the processing conditions set on the basis of image data stored in the prescan process.

7 Claims, 20 Drawing Sheets

FIG. 7

PRESCAN

CONNECTED SERVER : ABCDEFG

USER ID : XXXXXXX

APPLICATION ID : XXXXXXX

☐ TWO-SIDED ORIGINAL DOCUMENT

ID CONFIRMATION

PRESCAN

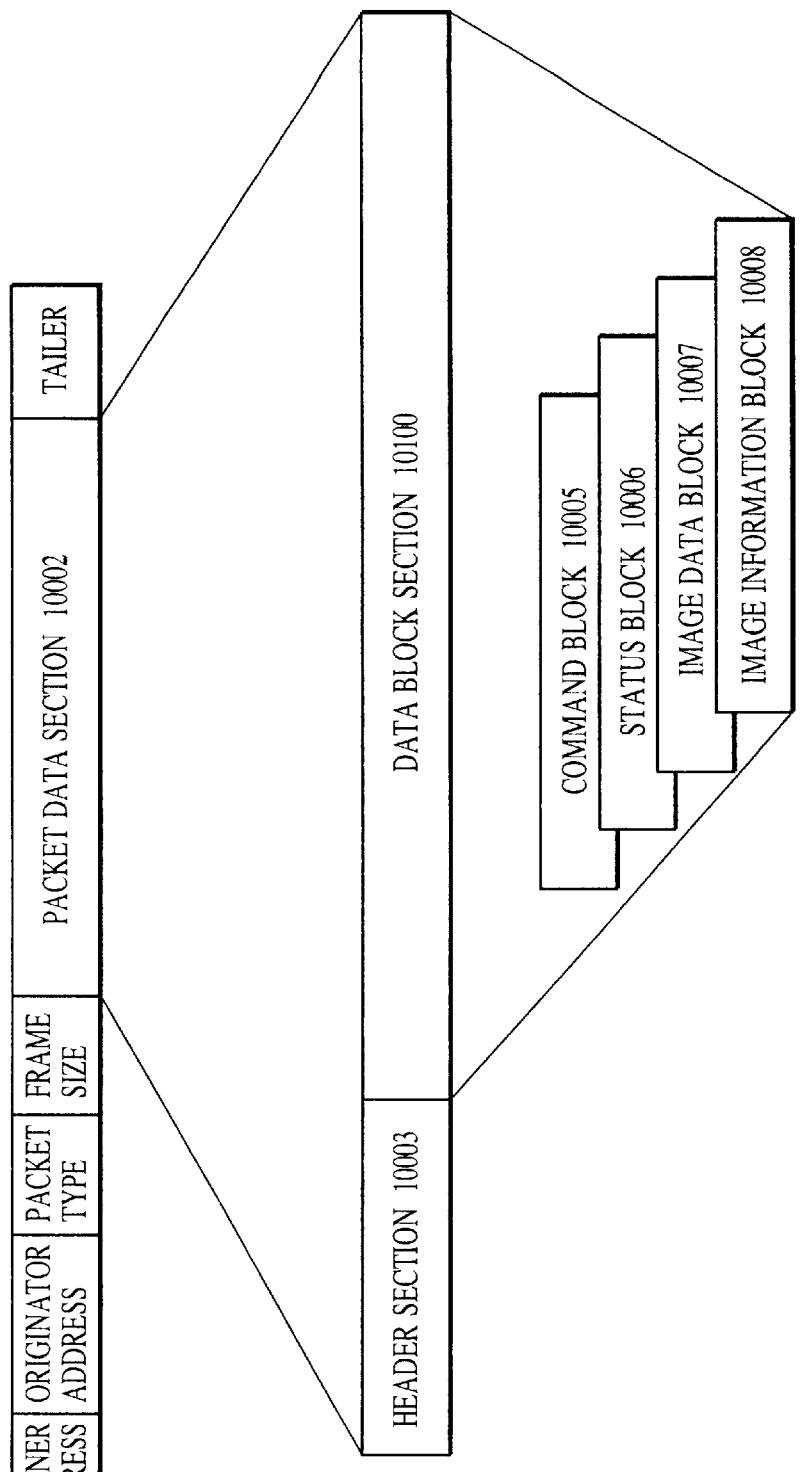

SCANNER SERVER APPARATUS AND SCANNER SERVER SYSTEM

BACKGROUND OF THE INVENTION

The present invention relates to a scanner server apparatus and a scanner server system which store image data from a scanner for photoelectrically reading an original image and transfer the stored image data to a processing apparatus over a network.

In recent years, a plurality of computers are often connected over a network so as to facilitate a sharing of data and printer resources. As a function therefor, the functions of a print server through which a plurality of users share a single printer and a scanner server through which a plurality of users share a single scanner have come to be valued.

As described above, the scanner server is designed to provide access to a single scanner by a plurality of computers on a network. This makes it possible to obviate the need to provide a dedicated scanner for each computer and simplifies the system configuration.

Unlike the print server for inputting and storing image data transferred through a network and printing out at any desired time, the scanner server requires a real time characteristic such that when an original document to be read is set in the scanner, the original document image is read and the image is stored.

Therefore, while the reading and storing of the document image set in the scanner is being performed in accordance with a command from a particular computer, the scanner server cannot respond to a request from any other computer. Further, while a process requiring processing time, such as editing of an image, is being performed by an execution of the image storage function of the scanner server, requests from the other computers are placed in a waiting state until the process is terminated.

Examples of such processes include storing image data, obtained by prescanning an original document image, in a scanner server, transferring the stored image data to a computer over a network and displaying it thereon, and setting various processing conditions for the displayed image, after which the original document image is scanned again (the final scan) and image processing is performed on the image data obtained thereby.

During such processing, the scanner and the scanner server are exclusively used for that process for a long period of time beginning with the prescan and continuing until the main scan is terminated.

SUMMARY OF THE INVENTION

The present invention has been achieved in view of the above points. It is an object of the present invention to make it possible for a scanner and a scanner server to efficiently operate.

It is another object of the present invention to improve the use efficiency of a scanner server which is connected over a network.

It is a further object of the present invention to make it possible to perform a prescan and a full scan at any desired independent time.

According to one aspect of the present invention, there is provided a scanner server apparatus for storing image data from a scanner for photoelectrically reading an original document image and transferring the stored image data through a network, wherein a prescan process for storing image data output from the scanner in a prescan for reading the original document image at a low resolution, and a final scan process for processing image data output from the scanner in a final scan for reading the original document image at a high resolution in accordance with the processing conditions set on the basis of the image data stored in the prescan process can be performed at independent times.

According to another aspect of the present invention, there is provided a scanner server system comprising: a scanner for photoelectrically reading an original document image; and a scanner server for storing image data output from the scanner and transferring the stored image data through a network, wherein the scanner is capable of performing a prescan for reading an original document image at a low resolution and a final scan for reading the original document image at a high resolution, and the scanner server is capable of performing a prescan process for storing image data output from the scanner in a prescan for reading the original document image at a low resolution, and a final scan process for processing image data output from the scanner in a final scan for reading the original document image at a high resolution in accordance with the processing conditions set on the basis of the image data stored in the prescan process at independent times.

According to a further aspect of the present invention, for the purpose of preventing an inadvertent deletion of the image data which is output from a scanner and is stored, there is provided an apparatus, comprising: storage means for storing image data output from a scanner for photoelectrically reading an original document image; transfer means for transferring the image data stored in the storage means to a processing apparatus through a network; and prohibition means for prohibiting the deletion of the image data stored in the storage means.

The above and further objects, aspects and novel features of the invention will become more apparent from the following detailed description when read in connection with the accompanying drawings.

BRIEF DESCRIPTION OF THE DRAWINGS

FIG. 7 shows a scan application image screen;

FIGS. 10A–10C show the structure of a data block section of the network packet;

DESCRIPTION OF THE PREFERRED EMBODIMENT

The preferred embodiment of the present invention will be described below in detail with reference to the accompanying drawings.

Figure 1:
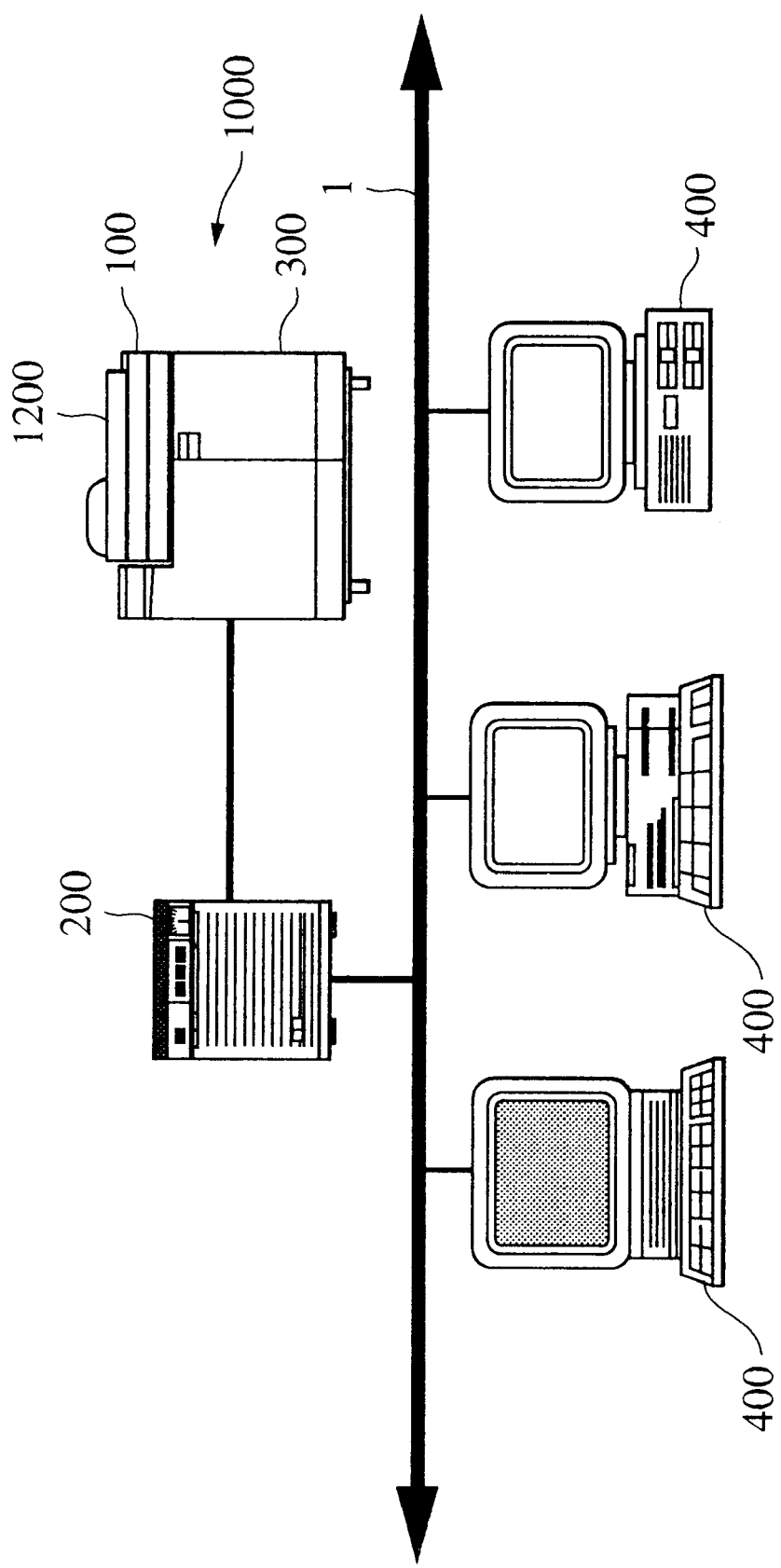
FIG. 1 shows the configuration of a network system.

FIG. 1 shows the configuration of a scanner server system according to the preferred embodiment of the present invention.

As shown in FIG. 1, the system of this embodiment comprises a digital color copying machine 1000 consisting of a digital color image reading section (hereinafter referred to as a color scanner) 100, a circulating reflective document feeding apparatus (hereinafter referred to as a feeder) 1200 which is set at the reading position of the color scanner 100 in the upper portion of the digital color copying machine 1000, and a digital color image print section (hereinafter referred to as a color printer) 300 for printing out a digital color image, a scanner server 200 connected over a network 1, and computers 400 of a plurality of client users.

Figure 2:
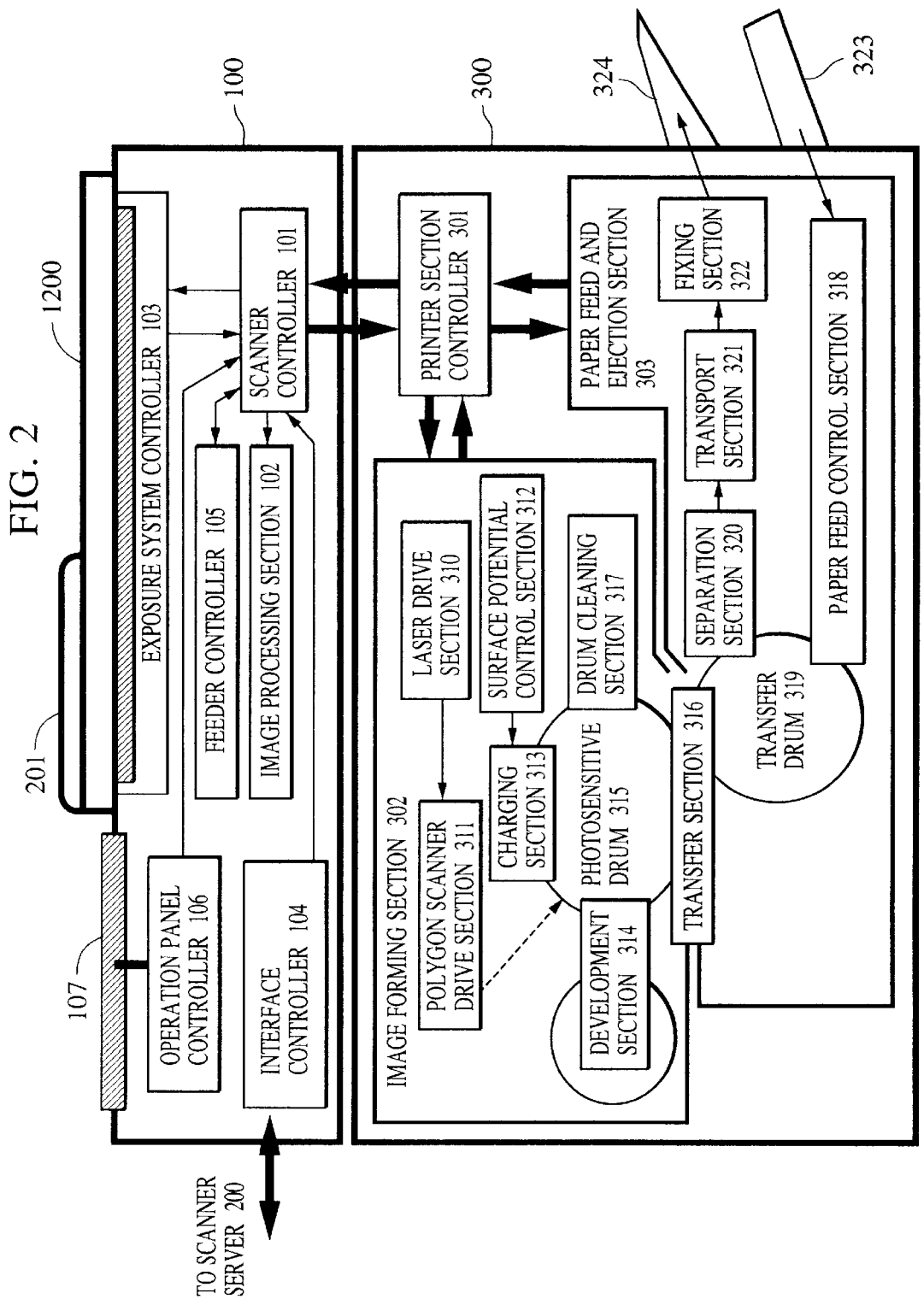
FIG. 2 shows the configuration of a digital color copying machine.

FIG. 2 shows the construction of the digital color copying machine 1000 having a scanner/printer function and the construction of the feeder. In the color scanner 100, a scanner controller 101 is the control center and performs the following control.

An original document on a document holder is color-separated for each color of RGB by means of a contact-type CCD line sensor inside an exposure system controller 103 and is converted into dot sequential analog image signals. These analog image signals are converted into digital image signals of 8 bits for each color by an A/D conversion section also inside the system controller 103, and each color of RGB which indicates luminance is output as a line sequential signal. This image signal (digital) is converted by an image processing section 102 from a luminance level of RGB into a level corresponding to the toner amount of four colors of CMYBk which indicates density. At the same time, a color correction computation is performed by the image processing section 102 on the signal, and various image processings, such as synthesis, scaling, or movement, are performed.

There is also provided an operation panel/touch sensor 107 which functions both as an operation panel for displaying a message for the user and as a touch sensor for instructing an operation. An operation panel controller 106 controls the touch sensor 107.

Set on the top of the document holder of the color scanner 100 is the feeder 1200 which is controlled by a feeder controller 105 inside the color scanner 100.

A guide plate for regulating the direction along the width of the document is provided on a carry tray 201 on which a bundle of original documents are set so that the original documents are not skewed when the documents are fed, and the original documents are made to slide and move vertical to the direction in which the original documents are fed. A slide volume is operated in linkage with the movement so as to detect the size (length) along the width of the original document.

Figure 5:
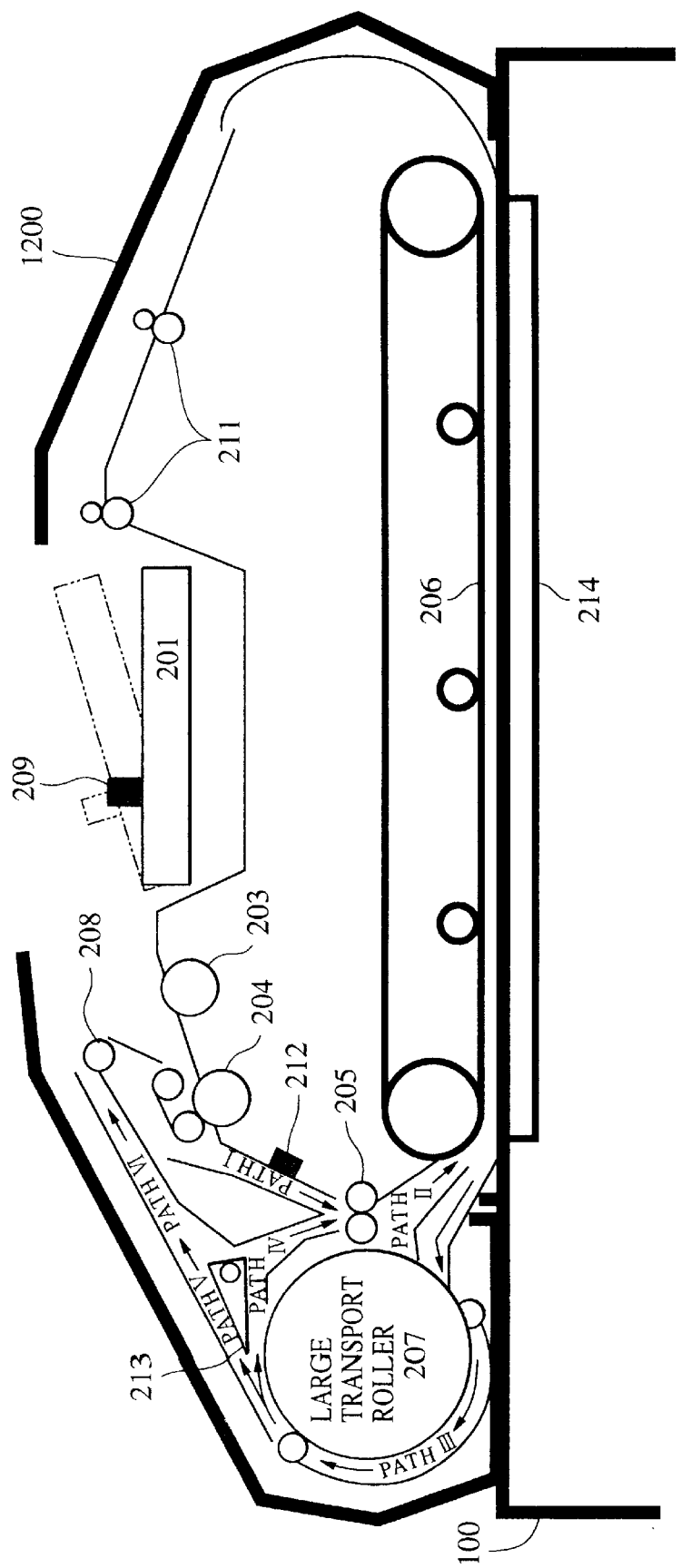
FIG. 5 shows the configuration of a feeder.

FIG. 5 shows the construction of the feeder 1200. Initially, original documents are separated one by one w from the bottommost part of the bundle of original documents set on the carry tray 201 by means of a semicircular roller 203 and a separation roller 204. While the separated original document is passed through path I, the paper width along the direction of paper feeding is detected by a contact-type paper-width sensor 212 provided in path I. The original document is passed through path II by a transport roller 205 and an entire-surface belt 206 and is transported to the exposure position of a platen glass 214 and stopped there.

After color-separation scanning by the contact-type CCD line sensor, the original document on the platen glass 214 is returned to the topmost of the bundle of original documents of the carry tray 201 again by a large transport roller 207 and a paper ejection roller 208 (the entire-surface belt 206 and a paper-ejection roller 211 in the case of original documents of a small size).

At this time, with a recycle lever 209 being placed on the top of the bundle of original documents at the start of document feeding, when original documents are fed in sequence, and the bottom end of the final original document goes through the recycle lever 209, the document goes down onto the carry tray 201 by its own weight. Thus, one cycle of the original document is detected.

The case of two-sided original documents will now be described. After the scanning of a first side is completed in the manner described above, the original document is passed through path III once, and a rotatable switching flapper 213 is switched, thereby guiding the top end of the document to pass through path IV. After the original document is passed through path II by the transport roller 205, the document is set on the platen glass 214 by the entire-surface belt 206. That is, the rotation of the large transport roller 207 causes the original document to be reversed in the route of path III-IV-II. Thereafter, scanning of a second side is performed, and the original document is ejected in the same way as that described above.

It is also possible to count the number of original documents by the paper-width sensor 212 by causing a bundle of documents to pass through path I-II-III-V-VI one by one to be transported until one cycle is detected by the recycle lever 209.

Referring back to FIG. 2, in a color printer 300, each of the digital image signals of C, M, Y and Bk received from the color scanner 100 is converted into a turn-on signal of a semiconductor laser section by a printer controller 301. The laser is controlled by a laser drive section 310, and the turn-on signal of the laser is output as a pulse width corresponding to the level of the digital image signal. The turn-on level of the laser has 256 levels (corresponding to 8 bits). The laser corresponding to this digital image signal is scanned by a polygon scanner drive section 311, and a color image is exposed in sequence for each color of C, M, Y and K in a digital dot form onto a photosensitive drum 315 charged by a charging section 313 controlled by a surface potential control section 312. After the color image is developed using each color toner by a development section 314, paper is fed from a paper cassette 323 under the control of a paper feeding control section 318 and the color image is transferred a plurality of times to a sheet of paper attached to a transfer drum 319 by means of a transfer section 316. Thereafter, the sheet of paper separated by a separation section 320 is transported by a transport section 321, is finally fixed by a fixing section 322, and is ejected onto a tray 324. In this way, an electrophotographic laser beam printer is formed.

The color scanner 100, the feeder 1200 and the color printer 300 function as a digital color copying machine 1000 by controlling the feeder 1200 and the color printer 300 under the control of the color scanner 100.

When functioning as the digital color copying machine 1000, an original document image is set on the platen glass 214 of the color scanner 100, and the copying start key displayed on the operation panel 107 is pressed. Thereupon, after passing through processes, such as reading of an image from the color scanner 100, image processing, and exposure, development, transfer and fixing in the color printer 300 in accordance with the above-described processes, an image is formed and output as a color copy.

Figure 3:
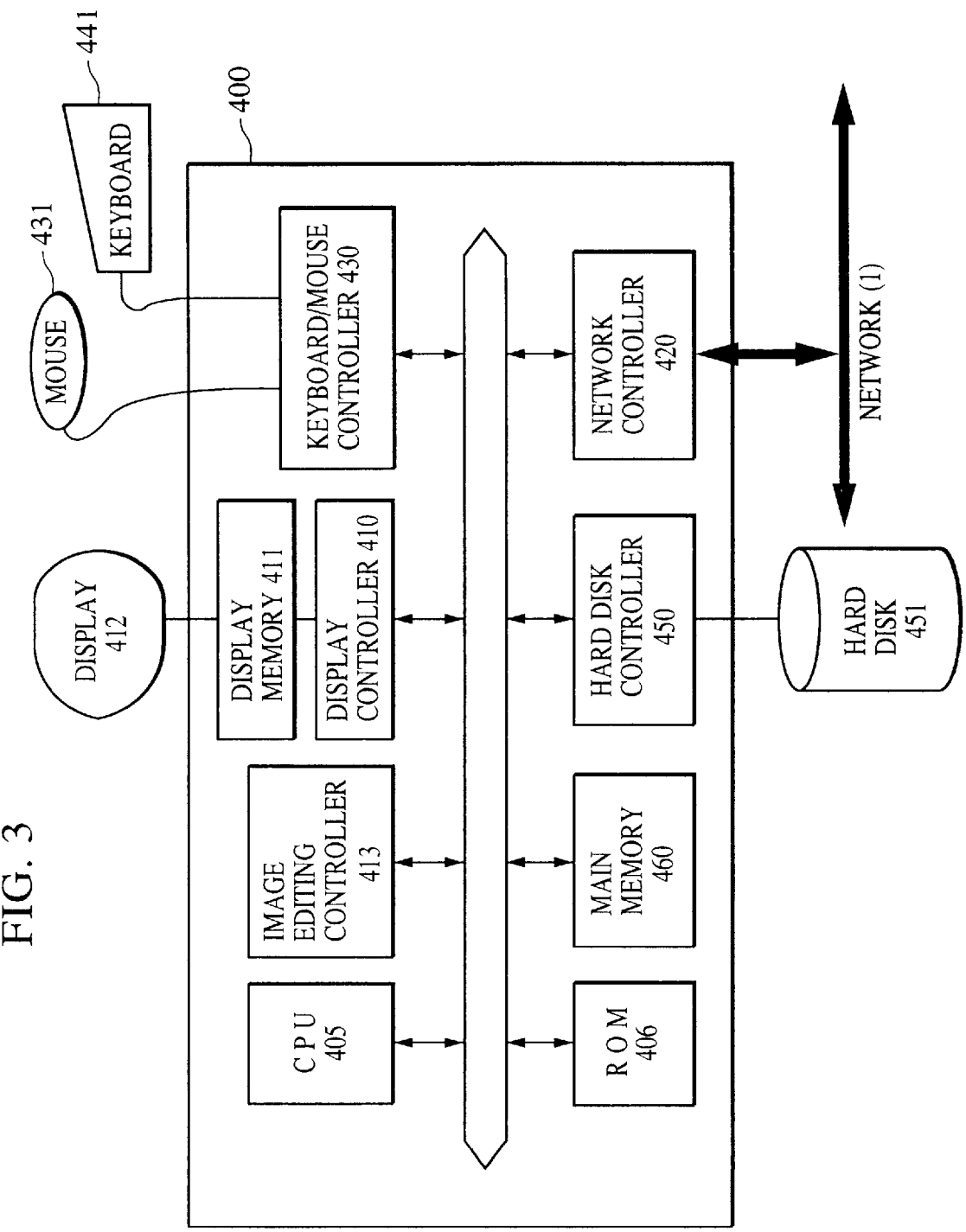
FIG. 3 shows the configuration of a client computer.

FIG. 3 shows the construction of a client computer 400 on a network.

The client computer 400 comprises a network controller 420 for controlling a protocol on the network with the scanner server 200, a CPU 405 for centrally controlling the client computer, a memory ROM 406 in which control programs of the CPU 405 are stored, a hard disk 451 for temporarily storing image data and storing various data, a hard disk controller 450 for controlling the hard disk 451, a main memory 460, a mouse 431 serving as instruction input means from an operator, a keyboard 441, a keyboard/mouse controller 430 for controlling the keyboard and the mouse, a color display 412 for layout, editing and menu display, a display memory 411, a display controller 410, and an image editing controller 413 for performing image layout and editing on the display memory 411.

Figure 4:
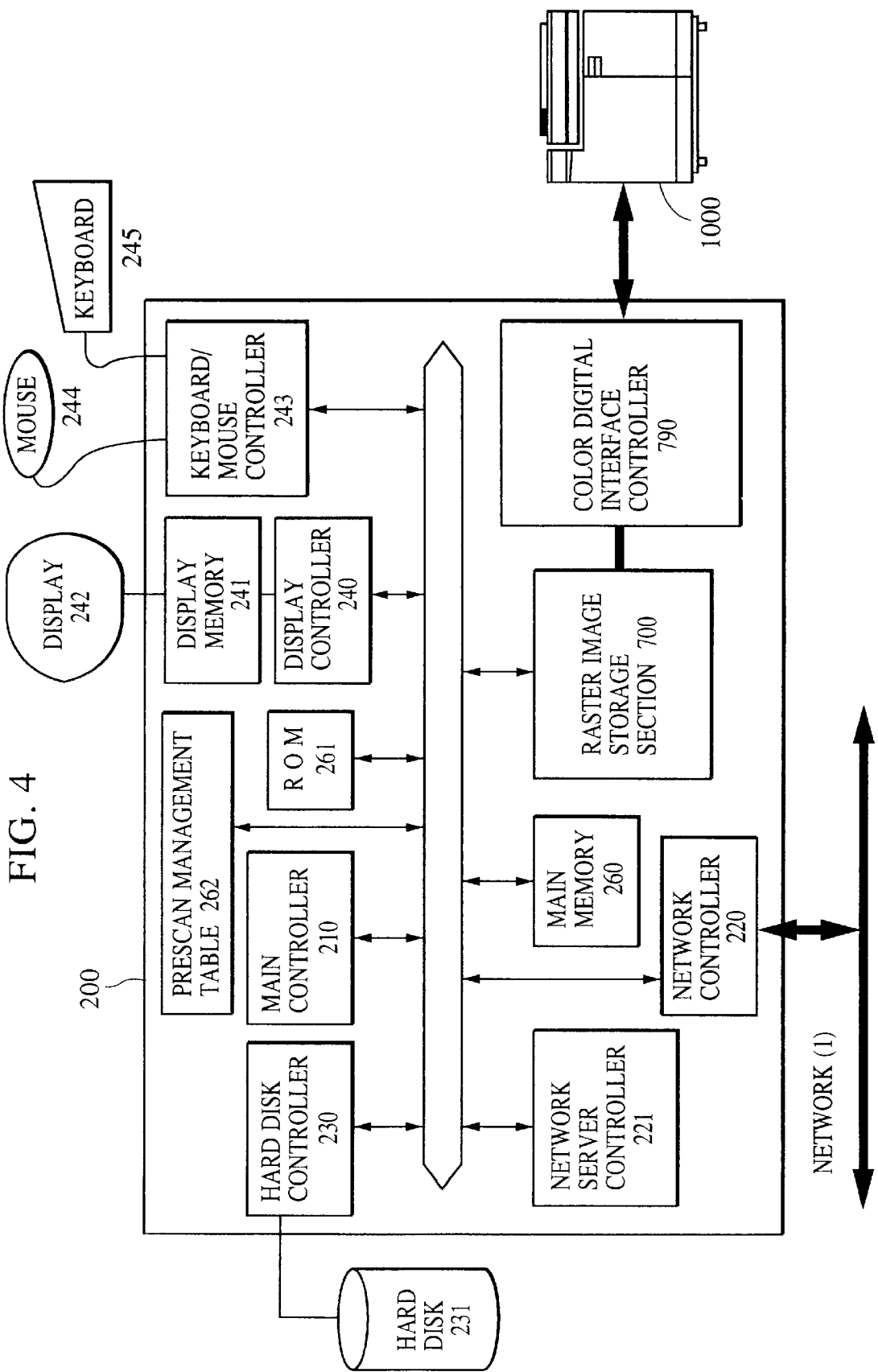
FIG. 4 shows the configuration of a scanner server.

FIG. 4 shows the scanner server 200 through which the digital color copying machine 1000 is connected to the network.

This apparatus can be broadly classified into the following elements:

(1) a main controller 210 for controlling the entire scanner server 200 in accordance with programs stored in a memory ROM 261;

(2) a network controller 220 for controlling the protocol process on the network, and a network server controller 221 for performing control as a server, for example, the analysis of the contents of the packet extracted in accordance with the protocol, and the separation of image data; and (3) the raster image storage section 700 for storing and managing color multi-valued raster image data and the position and attribute information thereof and for making a layout of image data on the basis of the separated image data and command data.

The interface is comprised of a color digital interface controller 790 for exchanging image data and commands through both-way communications with the digital color copying machine 1000, a mouse 244 and a keyboard 245 serving as instruction input means from a server administrator, a keyboard/mouse controller 243, a color display 242 for layout, editing and menu display, a display memory 241, and a display controller 240.

Further, a hard disk 231 and a hard disk controller 230 are also provided to store image data or the like.

Figure 6:
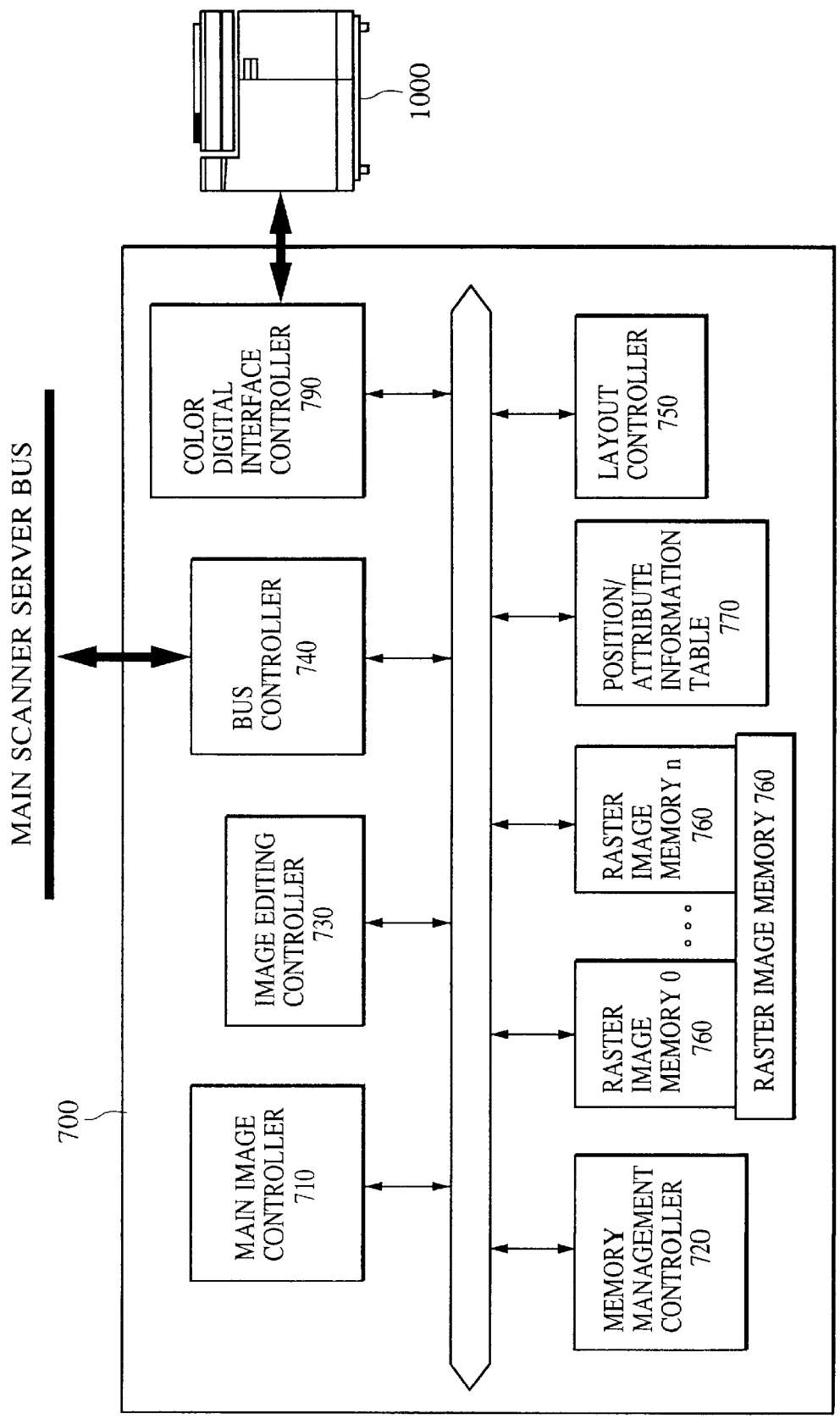
FIG. 6 shows the configuration of a raster image storage section.

FIG. 6 shows the construction of the raster image storage section 700 inside the scanner server 200.

This raster image storage section 700 includes a main image controller 710, which is the functional center, for controlling the entire raster image data, a memory management controller 720 for efficiently arranging and managing color raster image data in a raster image memory 760, and a management table 770 thereof.

Also serving as the functional centers are an image editing controller 730 for performing image conversion relating to color, and expansion/reduction/shape alteration editing onto image data which has already been entered or is entered onto the memory from the color scanner 100, and a layout controller 750 for performing layout editing in real time when the image data is output to the color printer 300.

When outputting the image data on the memory, a color print image can be obtained by transferring the image data to the color printer 300 via the color digital interface controller 790. Further, image data can be input from the color scanner 100 and entered onto the memory via the color digital interface controller 790.

The image data and commands are exchanged between the raster image storage section 700 and the scanner server 200 according to a specific format, and information is exchanged between the main image controller 710 and the main controller 210 via a bus controller 740.

This raster image storage section 700 is able to manage image data in both of a file management mode and a page mode.

In the printer output, the file management mode of the first mode functions to store and manage a plurality of image data. Layout is made for each of a plurality of entered image data in accordance with a command from the main controller 210 of the scanner server 200 and is output to the color printer 300 via the color digital interface controller 790, and thus a color print image can be obtained.

In such a case, the plurality of image data are managed as image files such that the raster image memory 760 is divided into a plurality of areas for each file. The start address of the memory, the image data length, the attributes of the image data, the positional information of the layout output of the image data and the like are entered in the position and attribute information table 770, and this table is managed by the memory management controller 720. Then, when the image data is actually output, image conversion relating to the color of the entered image data is performed by the image editing controller 730. Further, when making a layout output, expansion/reduction/shape alteration editing is performed by an layout controller 750 in order to make the image reach a specified position and size, and the image data is output to the color printer 300 via the color digital interface controller 790. Therefore, since the original image data is always in the memory, the image data can be output by changing the layout output format.

In a scanner input, the file management mode stores and manages a plurality of scanner input image data in the same way as in the print output. At this time, it is also possible integrate image data for a print output and image data for a scanner input.

The image input from the color scanner 100 is managed similarly to the case of printing, that is, such that the raster image memory 760 is divided into a plurality of areas. The start address of the memory, the image data length, the attributes of the image data and the like are entered into the attribute information table 770, and this table is managed by the memory management controller 720.

When the image is actually input, image conversion relating to the color of the scanner input image data input from the color scanner 100 is performed by the image editing controller 730. Further, expansion/reduction/shape alteration editing at the input time is performed by the layout controller 750 in order to make the image to a specified input size, and the image is entered onto the raster image memory.

In the page mode, another memory management mode, the raster image memory 760 is handled as one sheet of paper, and the memory is managed by width (WIDTH)/ height (HEIGHT). When a plurality of image data is each laid out on the memory, expansion/reduction/shape alteration editing and image conversion relating to the color of the image data are performed by the image editing controller 730 and the image data is located at the layout memory on the specified image memory.

The image data is placed at the position and made to a size specified by the layout controller 750 in this way, and the image data is output to the color printer 300 via the color digital interface controller 790, or the image data is entered onto the image memory at a size specified by the color scanner 100.

Figure 9A:
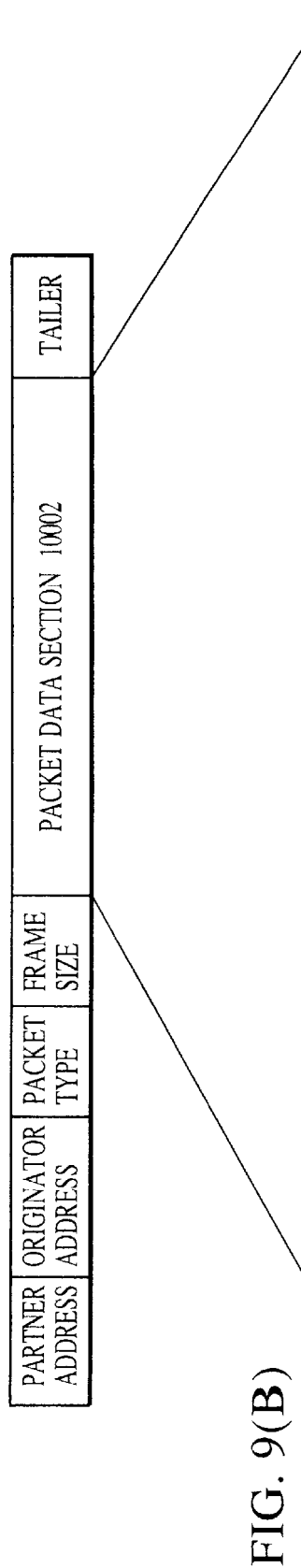
FIGS. 9A–9D show the structure of the whole and the header section of a network packet.

On the network on which the client computer 400 and the scanner server 200 are connected to each other, a data string, called a packet, shown at FIG. 9A is used as a single block, and packets are exchanged mutually to perform communication between the client computer 400 and the scanner server 200.

Figure 9B:
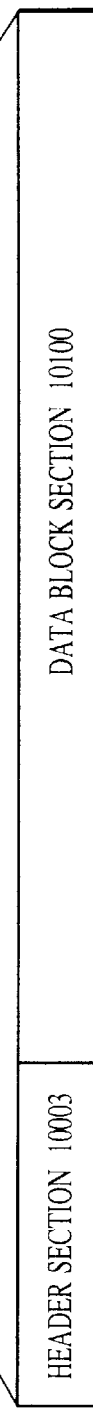

The structure of the packet will now be described. The network address of the destination party (partner address) is set at the beginning of the packet, followed by the network address of the origination party, and then the information of the packet type and frame size of the packet is set, followed by the actual packet data, and finally an error check of CRC (cyclic redundancy check) called a tailer is set which improves the reliability of data transfer. The contents of the packet data section 10002 are shown at FIG. 9B. Although any data can be placed in the packet data section 10002, in this embodiment, the packet data section 10002 is divided into a header section 10003 and a data block section 10100 as shown in FIG. 9B.

Figure 9C:
Figure 11:
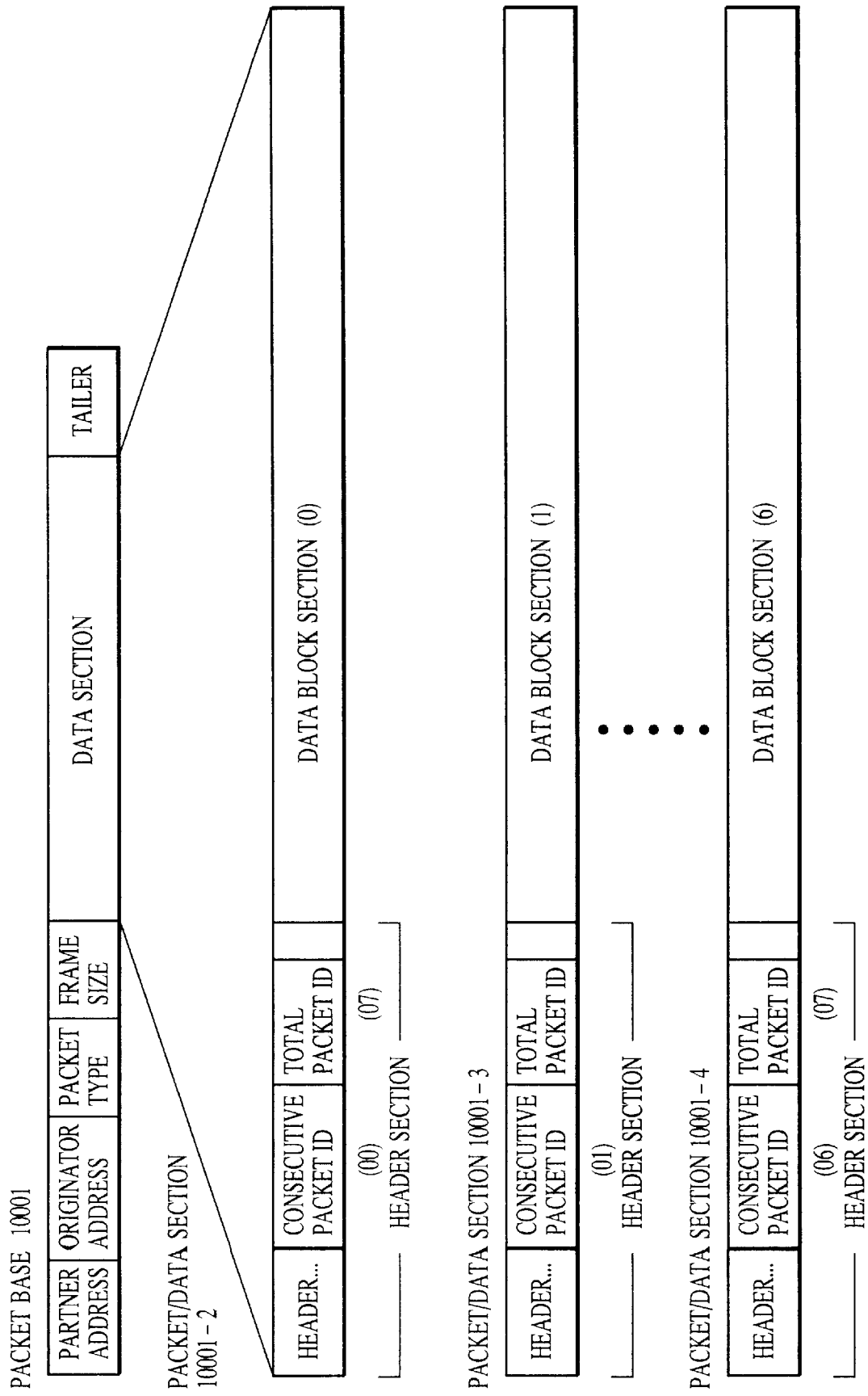
FIG. 11 shows the structure of a consecutive network packet.

The contents of the header section 10003 of the packet data section 10002 are shown at FIG. 9C. In the header section 10003, a header code 10019 which indicates header information is set at the beginning of the header section 10003, followed by a function code section 10020 indicating what functions this particular packet data has, then followed by a consecutive packet ID10030 indicating the ID of consecutive packets which form one data from a plurality of packets as shown in FIG. 11, a total packet ID10031 indicating the total number of packets thereof, and a data length 10032 indicating the length of the data of the data block section 10100 where actual data is located.

Figure 9D:
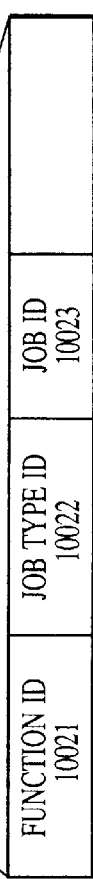

The contents of the function code section 10020 are shown at FIG. 9D. The function code section 10020 consists of function ID10021 indicating the type of the scanner server, a job type ID10022 indicating the type of the job for the server, and job ID10023 which identifies a job to be performed.

Next, the contents of the data block section 10100 of the packet data section 10002 are shown at FIG. 10C. As shown in FIG. 10C, the data block section 10100 is divided into a command block 10005, a status block 10006, an image data block 10007, and an image information block 10008 according to the contents of the uniquely determined job type ID10022 of the function code section 10020 of the header section ID10003.

Figure 13:
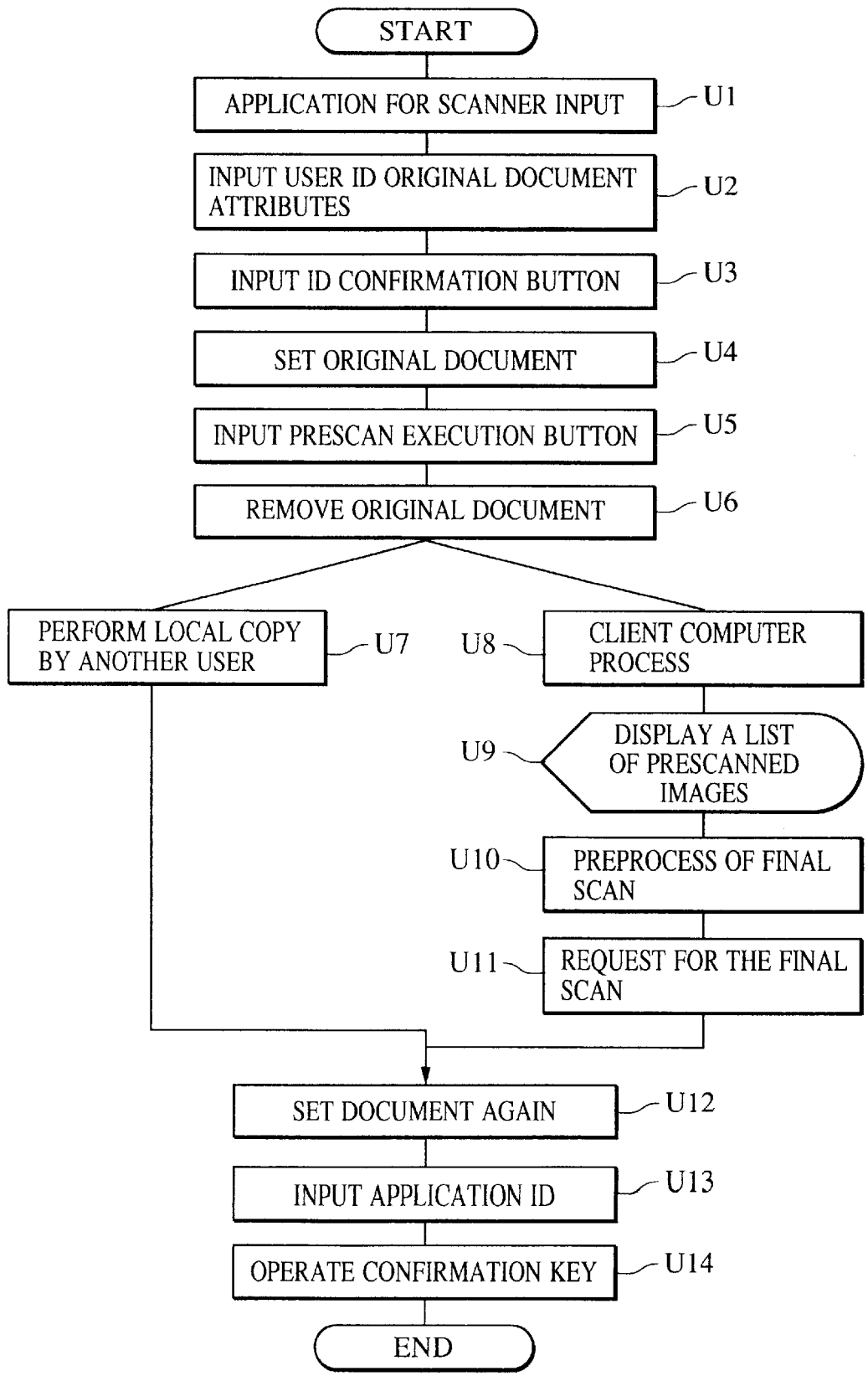
FIGS. 13 to 19 are flowcharts illustrating the operation and control procedure of a server system according to the present invention.

FIG. 13 shows a general flow for the operation procedure by the user of this scanner server system.

The scanning operation procedure of the scanner server system constructed as described above will now be described with reference to the flowcharts of FIGS. 14 to 19.

Figure 14:
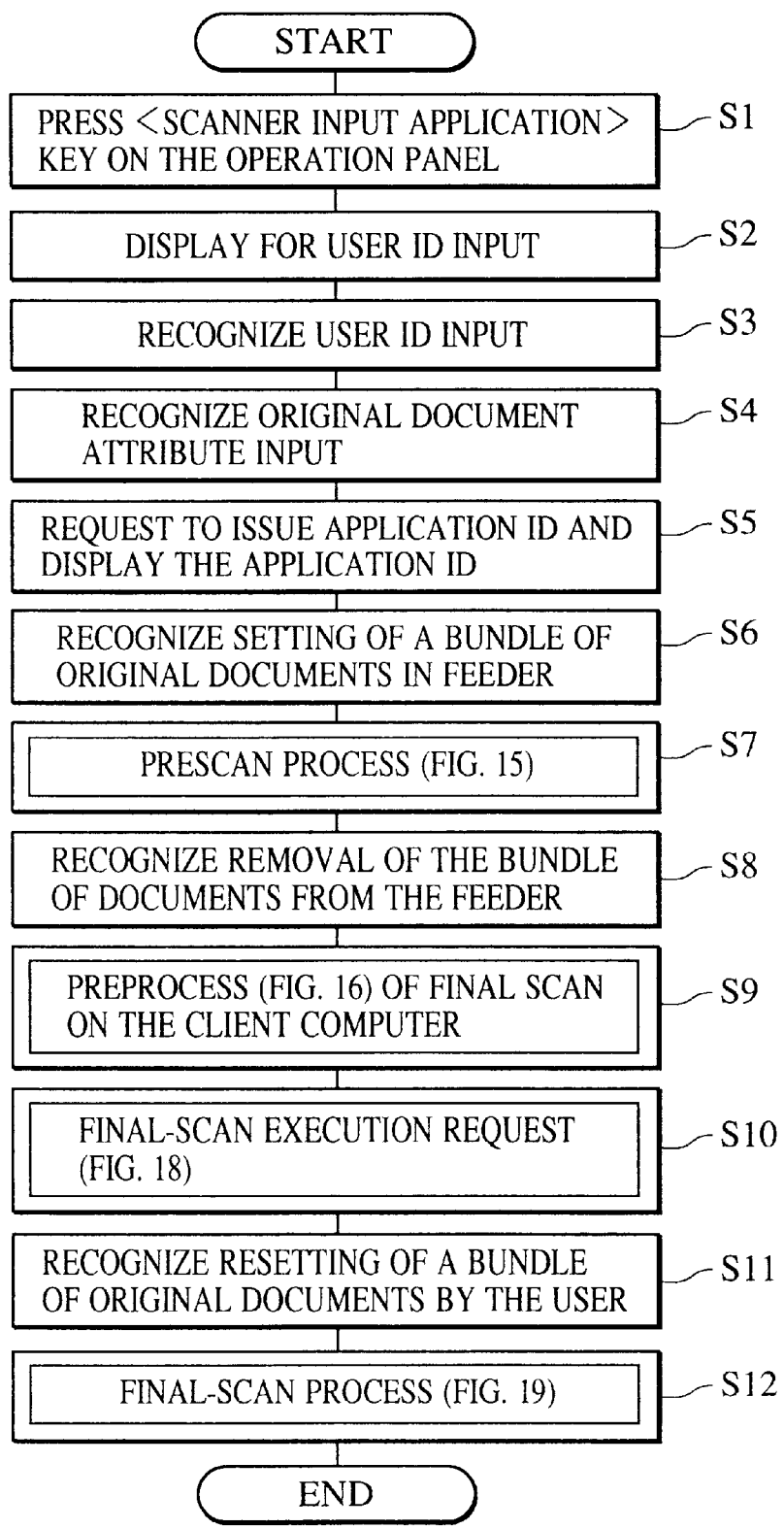

Initially, the operation of the scanner controller of the digital color copying machine in a scanner input application process will be described with reference to FIGS. 13 and 14.

The user presses the <scanner input application> key on the operation panel 107 of the digital color copying machine (step U1). When this key input is recognized (step S1), the portion where the user ID is to be input shown in FIG. 7 is displayed on the operation panel 107 (step S2). The user, using this display, inputs his/her uniquely determined user ID by using the 10-keypad on the operation panel 107. Further, the user specifies the original document attribute, i.e., whether the original document is a one-sided original document or a two-sided original document, by pressing the touch sensor of the operation panel 107 (step U2). When the user presses the ID confirmation button (step U3), both the user ID and the original document attribute are recognized by the scanner controller 101 (steps S3 and S4). The scanner controller 101 requests the main controller 210 to issue the scanning application ID (step S5). In response to this application, the main controller 210 searches a prescan management table 262 and returns a scan application ID which is not in use to the scanner controller 101. The scanner controller 101 causes the operation panel controller 106 to display the application ID on the operation panel 107.

Next, the user sets a bundle of original documents to be scanned on the carry tray 201 of the feeder 1200 (step U4). At this time, the guide plate is brought into alignment with the original document in order to prevent skew of the original document, and the paper width of the original document along the width thereof can be detected. The scanner controller 101 detects the setting of the bundle of original documents onto the carry tray 201 (step S6).

Figure 15:
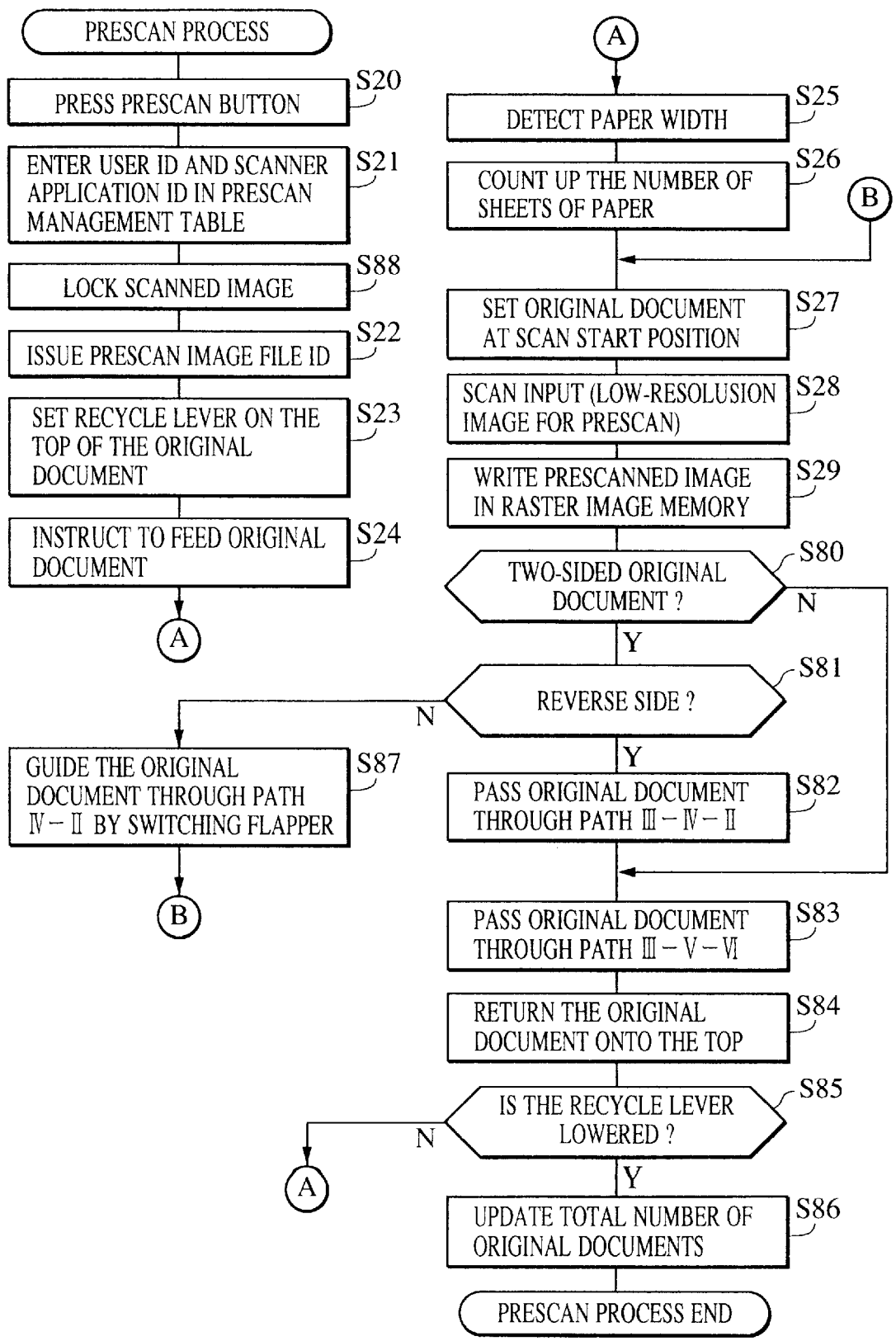

After confirming the setting of the bundle of original documents, the user presses the prescan execution button of the operation panel 107 (step U5). The scanner controller 101, confirming an input from the operation panel controller 106, performs a prescan process (step S7). The details of the prescan process are shown in FIG. 15.

When an "on" condition of the prescan execution button from the operation panel 107 is recognized (step S20), the user ID and the scanner application ID are sent out to the main controller 210 of the scanner server 200 via an interface controller 104. As a result, the main controller 210 enters the user ID scanner application ID in a prescan management table 262 having the structure shown in FIG. 12 (step S21).

The main controller 210 counts up the total number of prescan management data 262-1, searches for a prescan management table data 262-10 which is not in use, and sets the ID value of the table in a user ID 262-11 and a scanner application ID 262-12 within the data of the table.

Further, the main controller 210 confirms that it is operating in the above-described file management mode and sets the prescan image lock level 262-14 of the above-described allocated prescan management table data to a numeric value indicating a uniquely determined level at which the prescan image file cannot be deleted (step S88).

When the prescan image lock level 262-14 of each management data within the prescan management table has been set to a level at which the prescan image file cannot be deleted, the main controller 210 searches the table to check if the image file ID of each of the prescan and the final scan is the same as the entered image file ID within the prescan management table and forms an image file ID which is not the same as any other image file ID (step S22). Using this ID, the main image controller 710 sets up this ID as an image file ID into the memory management controller 720 in order to enter image data which is input via the interface controller 790 from the color scanner 100 in the prescan. For this reason, the prescan image files can be held as much as the capacity of the raster image memory 760 permits and can be controlled with no duplication with the settings of other users.

Figure 12:
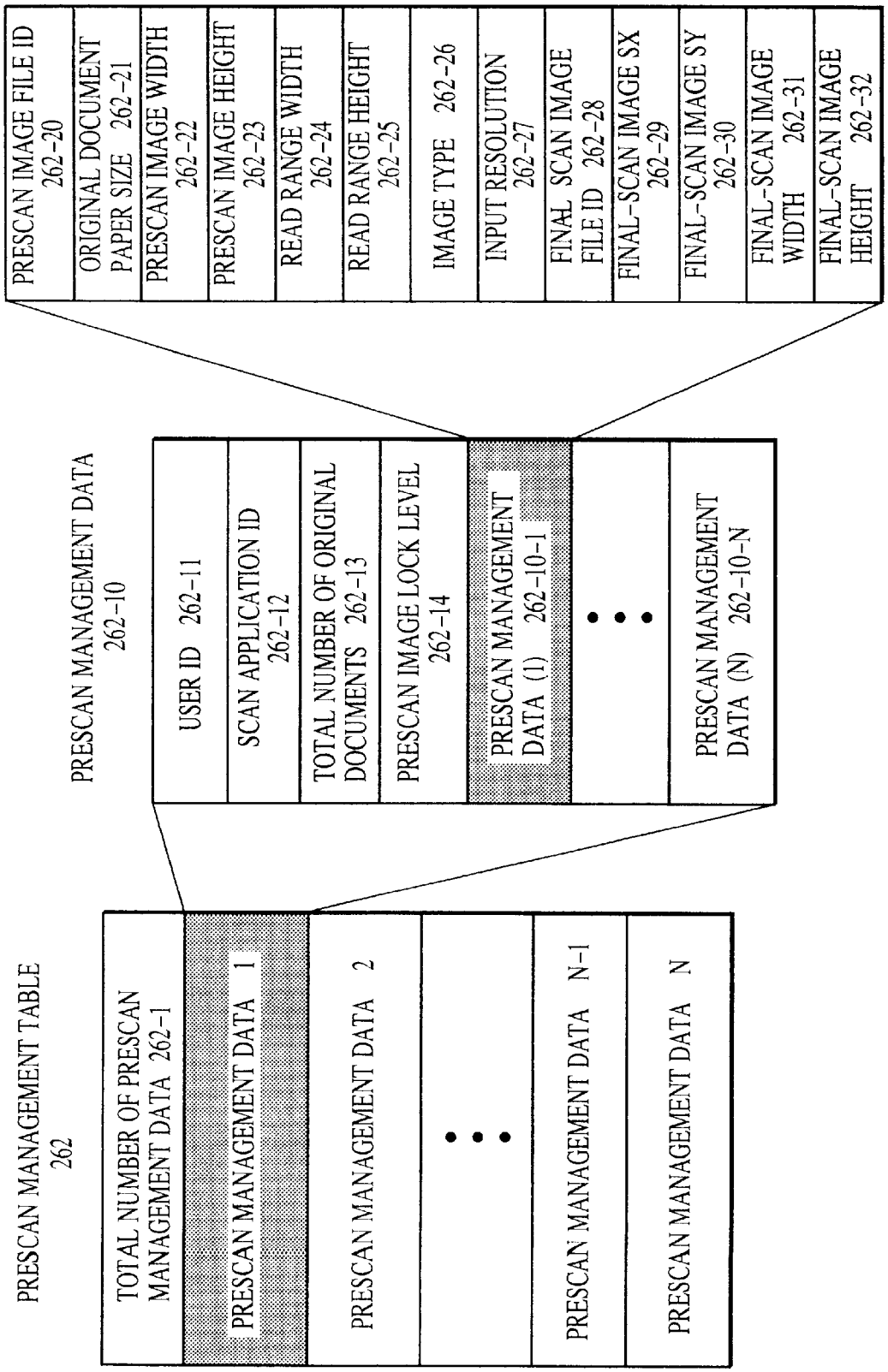
FIG. 12 shows the structure of a prescan management table.

This ID is entered in sequence for the number of original documents in a prescan image file ID 262-20 within the prescan management table 262-10 of FIG. 12.

When the above process is terminated, the main controller 210 of the scanner server 200 first sends a command for setting the recycle lever 209 to the scanner controller 101 of the digital color copying machine. When the setting command is recognized, the recycle lever 209 is set onto the topmost of the bundle of original documents on the carry tray 201 by the feeder controller 105, and a setting completion code is returned to the main controller 210 of the scanner server 200 (step S23).

Next, the scanner controller 101 sends a command for setting the bottommost sheet of the bundle of documents at the exposure start position of a platen glass 131 (step S24). The feeder controller 105 sets the original document on the platen glass 214 in accordance with the above-described process by driving the feeder 1200. At this time, the paper width along the paper feeding is detected (step S25) and the number of sheets of passed original documents (step S26) is counted by the paper-width sensor 212 provided in path I.

In this way, the original document is set on the platen glass 214 by the feeder 1200 (step S27). At this point in time, the main controller 210 triggers a scanner input to the color scanner 100 of the digital color copying machine 1000 via the color digital interface controller 790 (step S28). Thereupon, the color scanner 100 performs color-separation reading of the original document at a resolution lower than that of the final output by the final scanning. The scanner server 200 obtains the original document as RGB image data for a prescan and stores the RGB image data on the raster image memory 760 (step S29). At this time, the layout controller 750 converts the input image data in real time on the basis of the size of an image having a low resolution which is predetermined as the image attribute of the prescan, and each parameter of the color balance/image data type (RGB). Thereafter, the RGB image data is transferred to the raster image memory 760, and the fact that the image has been stored is entered in the position attribute information table 770 corresponding to the image file ID which was determined previously and managed.

After the above entry of the data, the original document on the platen glass 214 is returned back onto the topmost of the original documents after passing through path III-V-VI by the feeder 1200 (steps S80, S83 and S84). However, in the case where the scanning of a first side of a two-sided original document is terminated, after passing through path III, the original document is guided to path IV by a switching flapper 213, and is set onto the platen glass 214 being reversed (steps S80, S81 and S87). Then, after scanning the image of a second side of the two-sided original document by the color scanner 100 (steps S27, S28 and S29), the original document is reversed again in accordance with the above-described procedure and returned back to the topmost of the bundle of original documents (steps S80, S81, S82, S83 and S84).

Prescanning for one sheet of original document is performed in the above-described procedure, and the procedure for entering the prescanned image is repeatedly performed fully automatically up to the final original document set in the feeder 1200 (step S85).

Whether all of the original documents have been prescanned is detected by the feeder controller 105 on the basis of the fact that the recycle lever 209 fully goes down on the carry tray 201 on the feeder 1200, and the scanner controller 101 transmits the total number of original documents to the main controller 210 when all the original documents have been completely prescanned. In response to this transmission, the total number of original documents 262-13 of the prescan management table 262 is updated (step S86). This terminates the prescan process (step S7).

When the prescanning of all of the original documents has terminated, the user removes the bundle of documents on the feeder 1200 (step U6). The scanner controller 101 recognizes that the bundle of documents has been removed (step S8).

In the above-described prescan process, it is not necessary for monitoring, editing or a final scanning of the prescanned image to be performed. Therefore, since the bundle of documents can be removed at this point in time, it is possible for other users to use the digital color copying machine locally as a copying machine (step U7).

At this point, even if the user of another client computer 400 performs the above-described prescan procedure or the final scan, which will be described later, to perform a prescan and a final scan, if the prescan image lock level (262-14) of each management data within the prescan management table has been set to a level at which the prescan image file cannot be deleted, the main controller searches the prescan management table to check if each image file ID of the prescan and the final scan is the same as the image file IDs within the prescan management table and can set an image file ID, which is not the same as any other image file ID.

Figure 16:
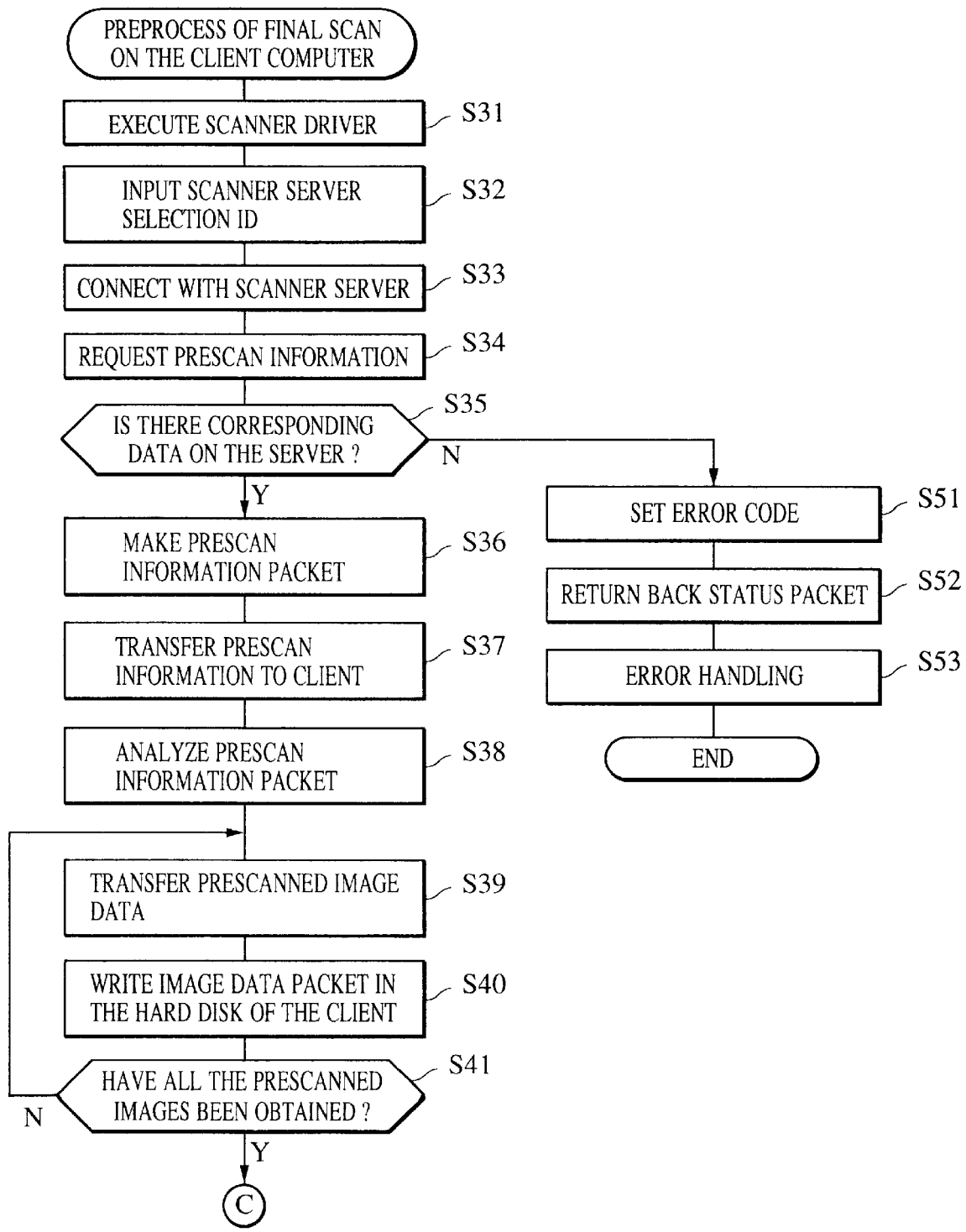
Figure 17:
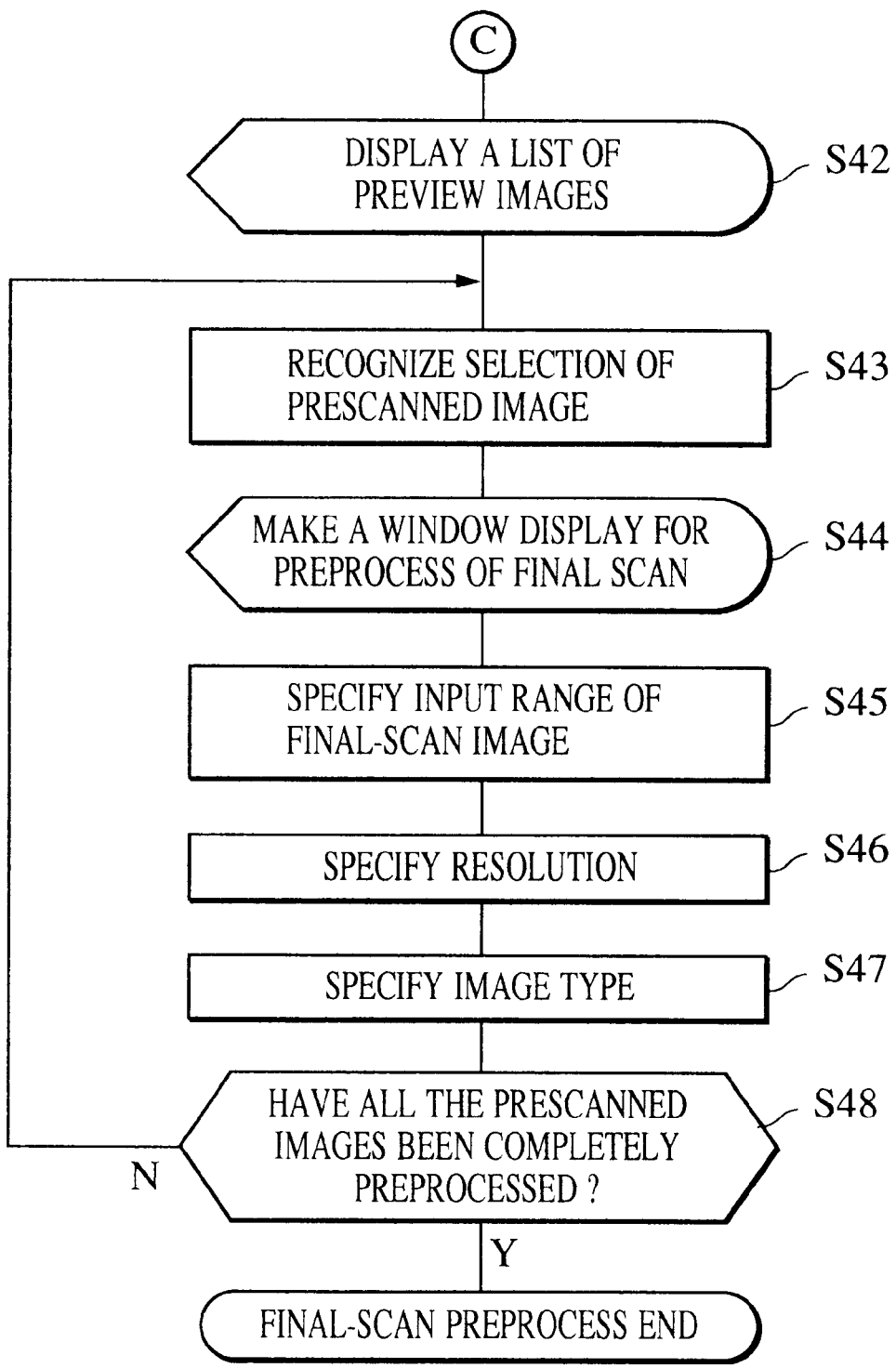

In the above-described way, the image data read in the prescan is stored in the raster image storage section 700 of the scanner server 200. Thereafter, it becomes possible to perform a process for an image to be finally scanned in accordance with monitoring of the prescanned image or an editing command using the prescanned image at any desired time. The final scan process will now be described. The user performs a client computer process (step U8) and a final-scan preprocessing operation (step U10) while monitoring the preview display of the prescanned image. The details of the final-scan preprocessing in accordance with the above operations are shown in FIG. 16. Software for a scanner input (hereinafter referred to as a scanner driver) is loaded onto the main memory 460 from the hard disk 451 on the client computer 400 (step U8), and the scanner driver is executed by the CPU 405 (step S31).

The user selects a scanner server which is a subject for the scanner driver and inputs the user ID and the scanner application ID obtained earlier on the operation panel 107 of the digital color copying machine 1000 from the keyboard 441. The scanner driver inputs this input information (step S32).

At this point, the scanner driver instructs the network controller 420 to communicate with the network controller 220 of the scanner server 200 (step S33).

Then, the scanner driver transmits a prescan information request (step S34). That is, on the basis of the network address of the scanner server, which is entered beforehand in the client computer, the network controller 420 sets the destination party address of a packet base 10001 and sets the ID of the color scanner which is determined uniquely as an ID for identifying functions into the function ID 10021 of a header section 10003 in order to show that the execution form is related o a color scanner. Job ID 10023 is set to 0 since no job as been determined yet, and a uniquely determined ID indicating the data block of the command is set in job type ID 10022.

Set in a data block section 10100 at this time are a <prescan information request> command and the user ID and the scanner application ID which are the parameters of the command.

Then, the client computer 400 transfers this packet data to the color scanner 100 via the network controller 420.

On the scanner server 200 side, the main controller 210 separates the contents of the packet into the header section 10003 and the data block section 10100, analyzes the contents of the data block section 10100 to be a command, and performs a process in accordance with the command.

Initially, the main controller 210 searches the prescan management table 262 for a corresponding table data on the basis of the user ID and the scanning application ID which are the parameters of the data block section 10100 (step S35). On the basis of the contents of the found table data, status information data is formed which consists of the user ID and the scanning application ID, the total number of original documents/file ID of the prescanned image/the paper size code of each prescanned image/prescanned image size (Width/Height), and the error code (step S36).

This status information data is set in the data block section 10100 of the packet data, the job type ID10022 within the header section 10003 is set to be the ID of a status block 100066 which is uniquely determined and is returned back to the client computer 400 described earlier (step S37).

On the other hand, when the subject prescan entry table data was not found, a uniquely determined error code is set (step S51) and is returned back to the client computer 400 which issued the <prescan information request> command (step S52). The client computer 400 performs error handling in accordance with the error code (step S53).

The client computer 400 separates and analyzes the contents of the packet data which was returned back from the scanner server 200 in the same way as in the above-mentioned scanner server 200 and obtains information, such as the prescan image file ID of a plurality of prescanned original documents and the total number of original documents (step S38).

In response to this, the client computer 400 transfers the plurality of prescanned image data in sequence from the scanner server 200 onto the client computer 400 (step S39). For this purpose, initially, the <image data GET> command is issued to the scanner server 200 on the basis of the above-described command issuance procedure. As a command parameter for such a case, the above-described prescanned image file ID is set.

In response to this command, in order to transfer the prescanned image file data corresponding to the image file ID to the client computer 400, the scanner server 200 sets the total number of image data blocks equivalent to the size of the image data in the total packet ID10031 of the header section 10020 and the image is transferred by attaching a successive packet ID in sequence to the image data blocks as a series of image data packets from the raster image memory 760.

These image data packets are sent to the client side in sequence in the same way as in the above-described transfer of packets, and the image data packets are transferred to the hard disk 451 of the client and stored therein (step S40).

The processes of steps S39 and S40 are performed in sequence on all of the prescanned image files of the prescan information table (step S41), and image data for preview is obtained on the client computer 400.

The client computer 400 which has obtained the image data for preview reads prescanned images in sequence from the hard disk 451 in order to display a preview image for the above-described total number of original documents and develops the prescanned image on the display memory 411 via the display controller 410 in order to display the window on the display 412 (step S42). The display contents take the form illustrated in FIG. 8A. Shown on the window in that figure are the ID (or an alias) of the scanner server, user ID ID802, a scanner application ID ID803, the total number of original documents 804, and a list of individual preview images 807 for the total number of original documents (step U9). Thus, the user is able to confirm individual prescanned images of the bundle of original documents.

Next, the user selects one prescanned image by using the mouse 431 from among the list of the preview images 807 in order to select the input range, the resolution of the input image and the image type (RGB, GrayScale, Bitmap or the like) for the individual prescanned images displayed on the display 412 (step U10). The CPU 405 recognizes this selected information (step S43).

When one of the previewed images is selected, a window for specifying various settings before a final scan (fully scanning an image) is performed is displayed (step S44).

This window consists of a prescanned whole image 853, a confirmation button 851 and a cancel button 852, a variator 855 for specifying the resolution for a final scan, and a button 856 for specifying image type. The user herein specifies the range of the actually necessary portion of the whole prescanned image by moving the mouse 431 (step S45). In this case, a frame 854 indicating the range to be scanned is displayed and moved as the mouse 431 is moved. The area coordinates at this time constitute the positional information of SX, SY, WIDTH and HEIGHT of the scanner input coordinates.

After specifying this reading range, the user selects the resolution at the final scan reading and the image type from among RGB, GrayScale and Bitmap by using the same image screen (steps S46 and S47), and presses the confirmation button 851 of <OK>. This determines the preprocesses relating to the one original document.

Figure 8A:
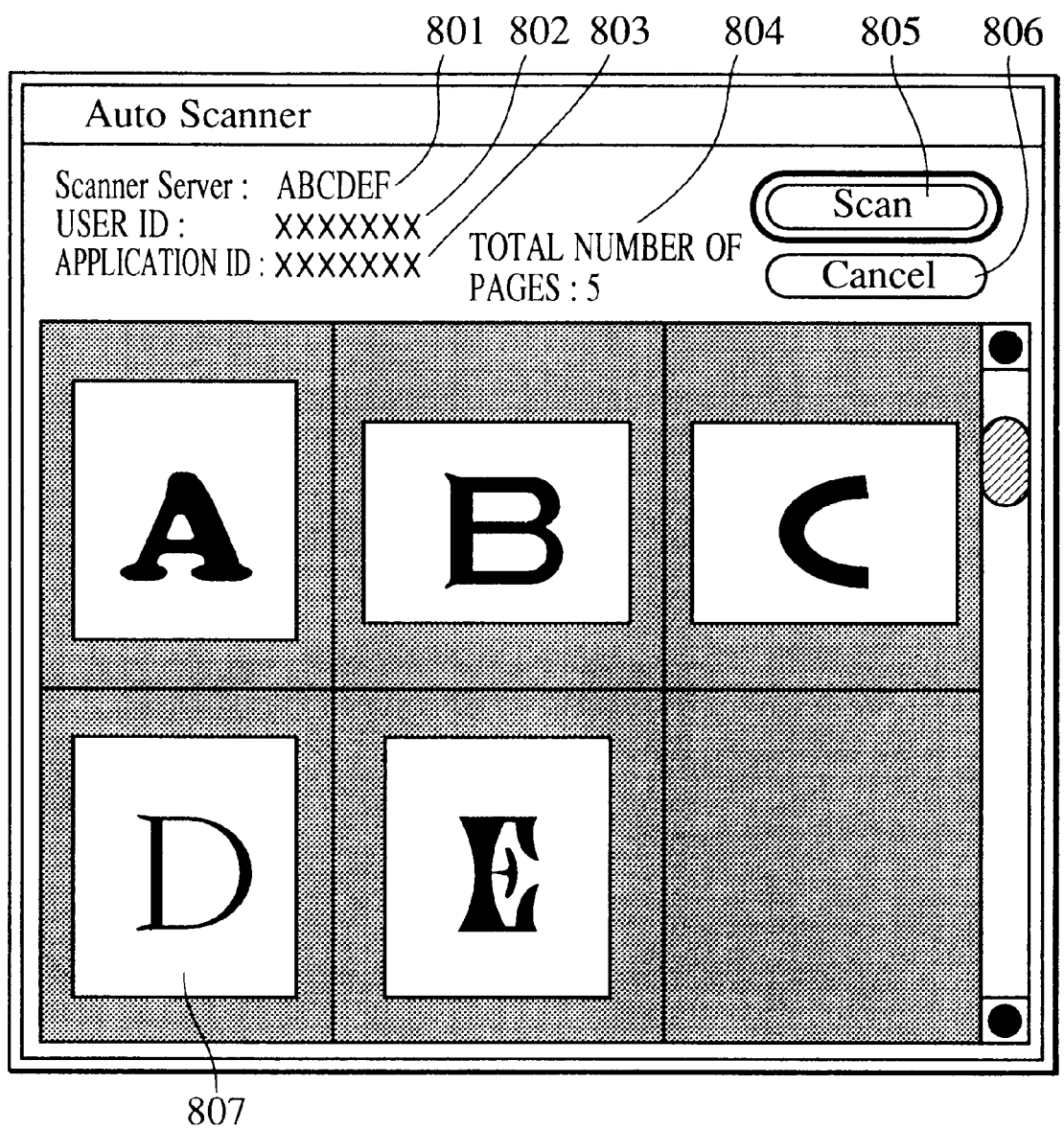
FIGS. 8A and 8B show a list of prescanned images.
Figure 8B:
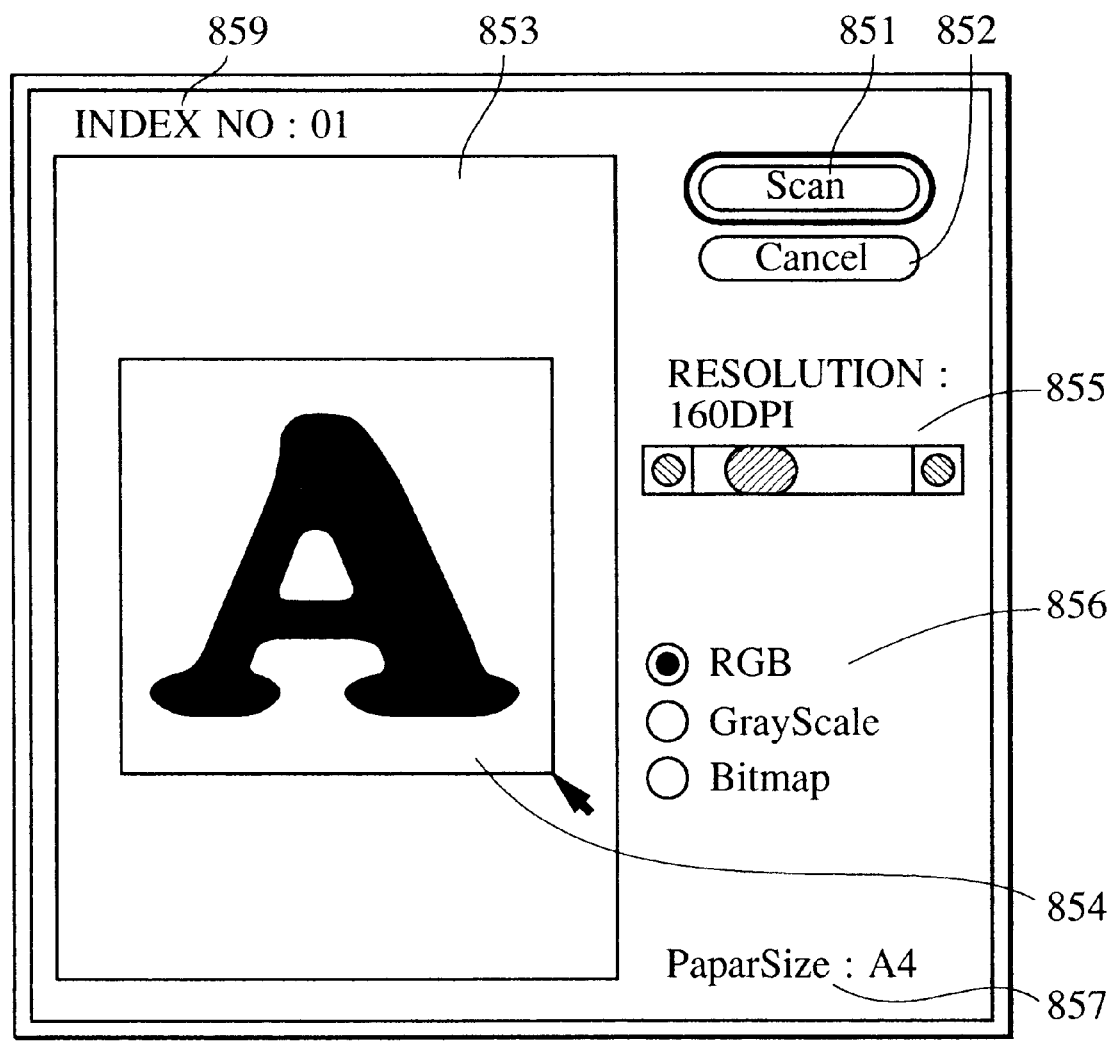

The series of preprocesses are performed on all of the prescanned images, and when this is terminated, the final scan execution button 805 of FIG. 8A is pressed (step S48).

This terminates the preprocess of the final scan. Then, a final scan request is made by the operation of the <Scan> button 805 (step S10).

Figure 18:
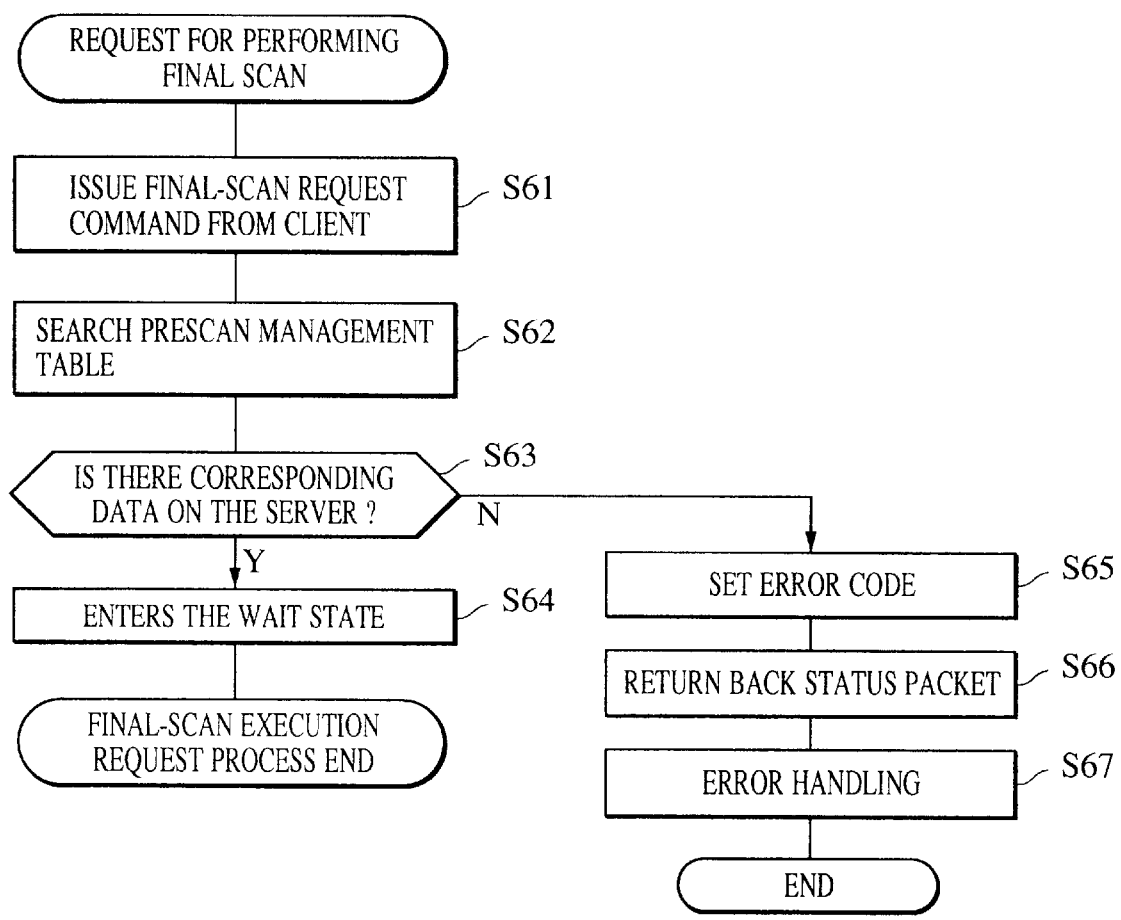

The details of the issuance of the final scan request command are shown in FIG. 18.

When this final scan execution button 805 is pressed (step U11 as described above, the CPU 405 of the client computer 400 sets in the data block section the <final scan request> command and the user ID and the scanner application ID which are the parameters of the command, and the input area coordinates (SX, SY, WIDTH and HEIGHT), the input resolution and the image data type which are set for each prescanned image by the user for this time. Then, the client computer 400 transfers this packet data to the scanner server 200 via the network controller 420 (step S61).

The scanner server 200 searches the prescan management table in accordance with the transferred packet data (step S62). If no subject prescan management table data is found or the scanner server is being used by another user, a uniquely determined error code is set (step S65) and the error code is returned back to the client computer 400 which has issued the <final scan request> command (step S66). The client computer receiving this error code performs error handling (step S67).

The search of the prescan management table by the scanner server 200 will now be described in detail. In the scanner server 200, the <final scan request> command is received via the network controller 220, and the contents are analyzed in the above-described way. Here, the main controller 210 searches for the contents of the prescan management table 262 on the basis of the user ID and the scanning application ID. When it is confirmed that there is relevant table data, the input area coordinates (SX, SY, WIDTH and HEIGHT), the input resolution and the image data type for each prescanned image for the purpose of the final scan are set in the final scan image coordinates (SX, SY, WIDTH and HEIGHT) 262-29, 262-30, 262-31 and 262-32, the input resolution 262-27 and the image data type 262-26 of the corresponding table data within the prescan management table 262.

Thereafter, the network controller 220 enters the wait state until a final scan request is received from the scanner controller 101 of the digital color copying machine 1000 (step S64). This terminates the final scan application process.

On the client computer 400, after the final scan button 805 is pressed, when the scanner driver confirms that no error has been returned from the scanner server 200, the scanner driver displays a message window indicating that the final scan has been reserved for the user.

At this time, the user sets the bundle of original documents prescanned earlier in the feeder 1200 of the digital color copying machine in the sequence as they were (step U12). The scanner controller 101 recognizes the setting of the bundle of original documents on the carry tray 201 (step S11). Then, the <scan input execution> key is pressed and the user ID and the scanning application ID are input on the operation panel 107 (step U13). Then, by pressing the <confirmation> key (step U14), the final scan operation is started in accordance with the parameters set in the client computer 400 by the user (step S12).

Figure 19:
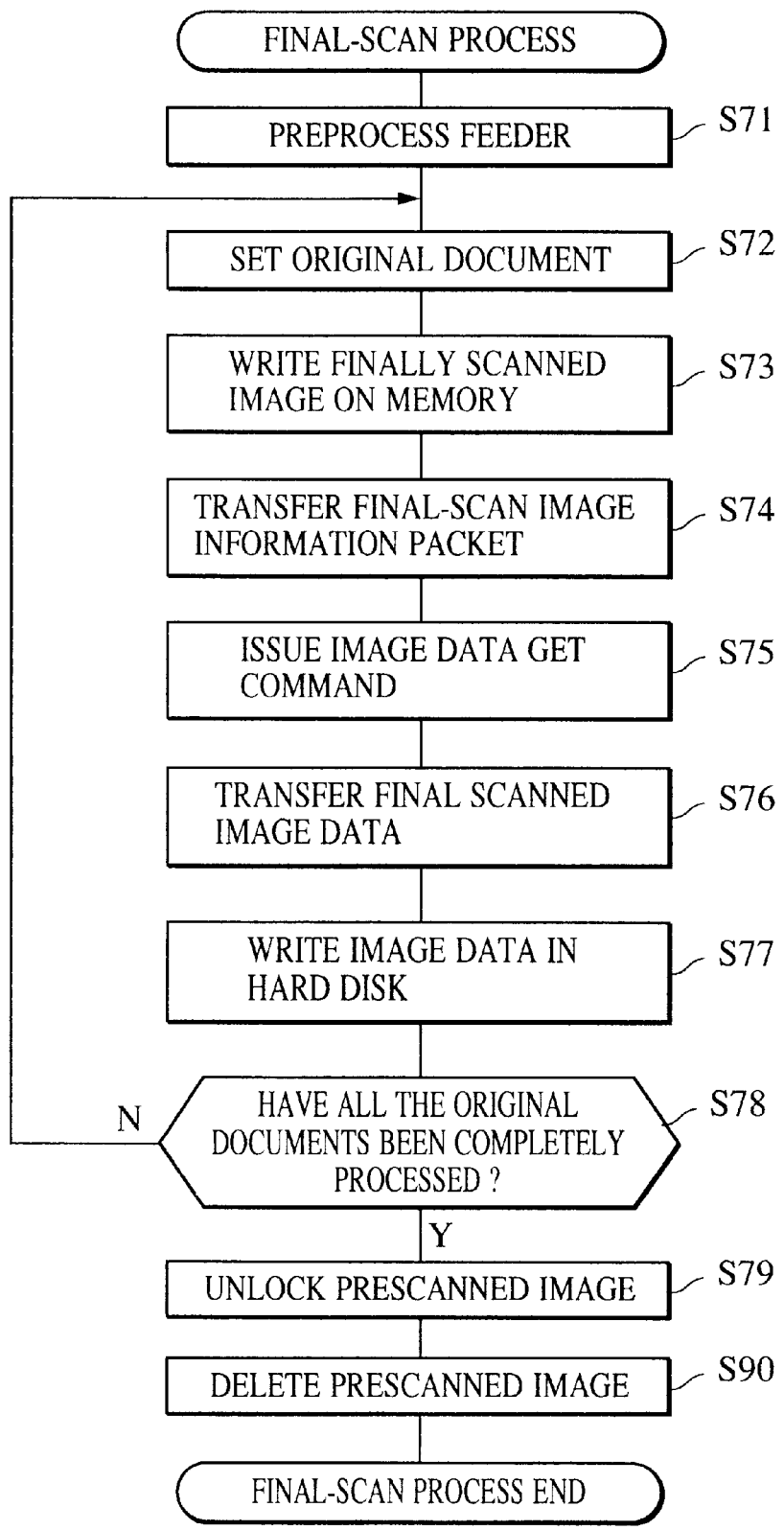

The final scan process will now be described with reference to FIG. 19.

When the scanner controller 101 recognizes that the <confirmation> key has been pressed on the operation panel 107, it requests the main controller 210 of the scanner server 200 to check if there is data of the prescan management table 262 corresponding to the user ID and the scanning application ID which have been input by the user. If there is corresponding data, in order to enter the finally scanned image data in the raster image memory 760, the main controller 210 sets the image file ID when the image data is entered in the memory management controller 720 to any desired image file ID, and sets it to a final-scan image file ID 262-28 of the prescan management table 262 as well.

Next, a command for setting the recycle lever 209 of the feeder 1200 is issued to a scanner controller 110 and a feeder controller 150 of the digital color copying machine 1000 (step S71). In this way, as in the above-described prescan process, the feeder 1200 sets the original document on the platen glass 214 (step S72) and triggers the scanner input.

In such a case, the layout controller 750 sets the parameters of the final scan range (SX, SY, WIDTH and HEIGHT), the input resolution and the image data type corresponding to the sequence of the original documents set earlier by the client on the basis of the prescan management table 262 corresponding to the user ID, and the scanning application ID. The layout controller 750 performs conversion based on the parameters on the input image data in real time, transfers and enters the finally scanned image received from the scanner controller into the raster image memory 760, and enters the image in the position attribute table 770 corresponding to the previously set image file ID and manages it (step S73).

When the image is entered, the main controller 210 of the scanner server 200 sets the finally scanned image file ID and the parameters of the image size (WIDTH and HEIGHT) within the status information data with respect to the client computer which has issued the <final scan request> command and returns back the packet data in order to notify the client computer 400 of the fact that the first original document has been finally scanned (step S74).

The client computer 400 issues the <image data GET> command to the scanner server in accordance with the above-described command issuance procedure (step S75). As a command parameter in such a case, the finally scanned image file ID in the above-mentioned status information is set.

In response to this command, in order to transfer the finally scanned file data corresponding to the image file ID to the client computer, the scanner server 200 attaches a successive packet ID to an image data block from the raster image memory 760 in sequence as in the above-described transfer of the prescanned image and transfers the image data blocks as a series of image data packets, as shown in FIG. 11 (step S76).

The client computer 400 transfers these image data packets to the hard disk 451 of the client in sequence in the same way as in the above-described transfer of packets and the image data packets are stored therein (step S77). In such a case, the scanner driver changes the image data packets to a fixed image file format at the same time.

The above procedure is repeated for the number of pages of the original documents of the prescan management table 262, and the final scan is automatically performed on the bundle of original documents on the feeder 1200 (step S78).

When all of the final scannings have been terminated, the main controller 210 changes the corresponding prescan image lock level 262-14 within the prescan management table to a level at which the prescanned image and the finally scanned image file can be deleted (step S90).

As described above, after the prescanned image lock level is set to an unlock state, the main controller 210 deletes the corresponding entered prescanned image file and finally scanned image file from the position and attribute information table 770 of the raster image memory 760 on the basis of their respective IDs (step S91). As a result, other users become able to use that image area.

Regarding the above-described prescan management table corresponding to the user of the prescan management table, it is possible to set beforehand whether the table data should be kept after the final scanning and whether the prescanned image should be kept or deleted after the final scanning as described above.

The finally scanned image data entered into the hard disk 451 can be freely processed by the user on the client computer 400.

As has been described up to this point, since the prescan process and the final scan process are completely separated, it becomes possible to use the copying machine locally during the time between the processes, and it becomes possible to perform a job of a scanner input requiring a real time characteristic among a plurality of users.

Further, since, for example, the lock function of the image file can be used, it becomes possible for the copying machine to be used locally by other users without damaging the prescanned image between the prescan process and the final scan process of original documents of a plurality of pages, which processes are completely separated, it becomes possible for other users on the network to perform a prescan process and a final scan process, and it becomes possible to perform a job of a scanner input requiring a real time characteristic among a plurality of users.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A scanner server apparatus, comprising:
   storage means for storing image data of an original document image scanned at a low resolution by a scanner;

transfer means for transferring the image data stored in said storage means to a processing apparatus through a network for previewing the original document image at the processing apparatus;

receiving means for receiving a final scan request from the processing apparatus through the network;

control means for controlling the scanner so as to finally scan the original document image at a high resolution in accordance with the final scan request received by said receiving means; and control means for prohibiting the deletion of the image data of the low resolution stored in said storage means until the original document image is finally scanned at the high resolution by the scanner and for deleting the image data of the low resolution stored in said storage means after the original document image is finally scanned at the high resolution by the scanner in accordance with the final scan request received by said receiving means.

2. A scanner server apparatus according to claim 1, further comprising: table means for storing the attributes of the image data stored in said storage means, said table means storing data indicating whether or not deletion of the image data should be permitted.

3. A scanner server apparatus according to claim 1, wherein when a process relating to the image data stored in said storage means is completed, a state by which the image data cannot be deleted is released.

4. A scanner server system, comprising:

a scanner for scanning an original document image;

storage means for storing image data of the original document image scanned at a low resolution by said scanner;

transferring means for transferring the image data stored in said storage means to a processing apparatus through a network for previewing the original document image at the processing apparatus;

receiving means for receiving image processing conditions for the previewed original document image from the processing apparatus through the network;

processing means for processing image data of the original document image scanned at a high resolution by said scanner in accordance with the image processing conditions received by said receiving means; and control means for prohibiting the deletion of the image data of the low resolution stored in said storage means until the image data of the high resolution is processed by said processing means and for deleting the image data of the low resolution stored in said storage means after the image data of the high resolution is processed by said processing means in accordance with the image processing conditions received by said receiving means.

5. A scanner server system according to claim 4, wherein said storage means stores image data of a plurality of original document images scanned at the low resolution by said scanner.

6. A scanner server system according to claim 4, further comprising printing means for printing an image based on the image data processed by said processing means.

7. An image processing method for a scanner server system comprising a scanner for scanning an original document image, and a server for storing image data from the scanner and transferring the stored image data to a processing apparatus through a network, said image processing method comprising:

prescanning at a low resolution an original document image by the scanner;

storing image data of the prescanned original document image in the server;

transferring the stored image data of the prescanned original document image to the processing apparatus through the network;

receiving image processing conditions for the prescanned original document image from the processing apparatus through the network;

finally scanning the original document image at a high resolution by the scanner;

processing image data of the finally scanned original document image in accordance with the image processing conditions received from the processing apparatus;

prohibiting the deletion of the stored image data of the prescanned original document image until the original document image is scanned at the high resolution by the scanner; and deleting the stored image data of the prescanned original document image after the image data of the finally scanned original document image is processed in accordance with the image processing conditions received from the processing apparatus.

* * * * *